United States Patent
Wang et al.

(10) Patent No.: US 10,387,859 B2
(45) Date of Patent: Aug. 20, 2019

(54) CRAWLER-TYPE AUTOMATIC VENDING MACHINE AND AUTOMATIC VENDING METHOD THEREOF

(71) Applicants: HUNAN SCIENTOP AUTOMATIC EQUIPMENT SHARES CO.LTD, Changsha (CN); Shen Wang, Changsha (CN)

(72) Inventors: Shen Wang, Changsha (CN); Yunliang Liu, Changsha (CN); Xuekun Yu, Changsha (CN); Wen Long, Changsha (CN)

(*) Notice: Subject to any disclaimer, the term of this patent is extended or adjusted under 35 U.S.C. 154(b) by 0 days.

(21) Appl. No.: 16/024,790

(22) Filed: Jun. 30, 2018

(65) Prior Publication Data

US 2019/0172032 A1   Jun. 6, 2019

Related U.S. Application Data

(63) Continuation of application No. PCT/CN2017/114884, filed on Dec. 7, 2017.

(30) Foreign Application Priority Data

Dec. 1, 2017 (CN) .......................... 2017 1 1251100

(51) Int. Cl.
*G07G 1/12* (2006.01)
*G06Q 20/18* (2012.01)
*G05B 19/042* (2006.01)
*G06K 9/00* (2006.01)
*G06F 3/041* (2006.01)

(52) U.S. Cl.
CPC ........... *G06Q 20/18* (2013.01); *G05B 19/042* (2013.01); *G07G 1/12* (2013.01); *G05B 2219/2645* (2013.01); *G06F 3/041* (2013.01); *G06K 9/00255* (2013.01)

(58) Field of Classification Search
CPC .................. G06Q 20/18; G05B 19/042; G05B 2219/2645; G07G 1/12; G06F 3/041; G06K 9/00255
USPC ........................................................ 235/381
See application file for complete search history.

(56) References Cited

U.S. PATENT DOCUMENTS

| | | | |
|---|---|---|---|
| 6,571,150 B2 | 5/2003 | Arai et al. | |
| 8,061,555 B2 * | 11/2011 | Guglielmi | G07F 11/007 194/212 |
| 9,361,746 B2 * | 6/2016 | Otzen | G07F 11/165 |

(Continued)

FOREIGN PATENT DOCUMENTS

CN   102306420 A   1/2012

*Primary Examiner* — Seung H Lee
(74) *Attorney, Agent, or Firm* — Erson IP (Nelson IP)

(57) ABSTRACT

A crawler-type automatic vending machine includes a replenishment unit, m transfer units, n container units, a detection and control unit, a cloud management platform and a payment system. The replenishment unit, the transfer units and the container units are connected successively to form an integral crawler-type automatic vending machine, wherein m and n are natural numbers other than 0; when n is equal to 1, m is equal 1; when n is greater than 1, m is equal to n+1; and when n is greater than 1 and m is equal to n+1, the m transfer units and the n container units are connected alternately, and the last unit is the transfer unit. When n is equal to 1 and m is equal 1, the transfer units and the container units are made into an integral structure.

15 Claims, 26 Drawing Sheets

(56) References Cited

U.S. PATENT DOCUMENTS 9,640,014 B2 * 5/2017 Pritchard ................ G07F 9/02
2010/0332027 A1 12/2010 Ochi

* cited by examiner

Top view

E-E

Enlarged partial view II

Enlarged partial view III

CRAWLER-TYPE AUTOMATIC VENDING MACHINE AND AUTOMATIC VENDING METHOD THEREOF

CROSS-REFERENCE TO RELATED APPLICATIONS

This application is a continuation of International Patent Application No. PCT/CN2017/114884 with a filing date of Dec. 7, 2017, designating the United States, now pending, and further claims priority to Chinese Patent Application No. 201711251100.1 with a filing date of Dec. 1, 2017. The content of the aforementioned applications, including any intervening amendments thereto, are incorporated herein by reference.

TECHNICAL FIELD

The disclosure belongs to the technical field of commercial mechanical equipment, and particularly relates to a crawler-type automatic vending machine and an automatic vending method thereof.

BACKGROUND OF THE PRESENT INVENTION

An automatic vending machine, which is common equipment of commercial automation, is free from the limit of times and places, could save manpower and facilitate the transaction, is a brand-new commercial retail form, and is also called as a 24-hour miniature supermarket.

Currently, according to the difference of aisles, traditional automatic vending machines are mainly classified into: a spring spiral aisle vending machine, a crawler aisle vending machine, a grid cabinet vending machine, an S-shaped stacking aisle vending machine, etc. Each vending machine has different application scopes due to the limit of characteristics thereof. Therefore, according to the sold goods, the vending machines could be classified into: an automatic drink vending machine, an automatic food vending machine, an automatic audit product machine, and a comprehensive automatic vending machine.

The above-mentioned vending machines have main disadvantages that: the spring spiral aisle vending machine easily gets stuck when selling bottled drink, and has relatively high requirements for placing; the crawler aisle vending machine could not sell commodities which do not stand stably (as long as one commodity falls down, it would fall down the whole aisle like domino); the multi-gate grid cabinet vending machine can accommodate fewer commodities, and thus, has low space utilization rate; and the S-shaped stacking aisle vending machine has complicated structure, high design and processing difficulties and high requirements, and general enterprises have no ability to produce such vending machine, and moreover, commodities sold by such vending machine are limited. The above-mentioned vending machines require workers to place the goods in the corresponding aisles one by one carefully, thereby wasting time and energy; and moreover, each aisle has relative small adaptability to sold commodities, and all vending machines except the multi-gate grid cabinet vending machine require that the goods have considerable breaking resistance.

SUMMARY OF PRESENT INVENTION

The present invention aims at providing a crawler-type automatic vending machine and an automatic vending method thereof, to solve the problems that a traditional vending machine performs manual replenishment, the replenishment is troublesome and wastes time and energy, and the adaptability to the sold commodities is poor.

The present invention adopts the technical solution that:

A crawler-type automatic vending machine comprises a replenishment unit, m transfer units, n container units, a detection and control unit, a cloud management platform and a payment system, wherein the replenishment unit, the transfer units and the container units are connected successively to form an integral crawler-type automatic vending machine, and wherein m and n are natural numbers other than 0; when n is equal to 1, m is equal 1; when n is greater than 1, m is equal to n+1; and when n is greater than 1 and m is equal to n+1, the m transfer units and the n container units are connected alternately, and the last unit is the transfer unit.

In the above technical solution, when n is equal 1 and m is equal 1, the transfer units and the container units are made into an integrated structure.

In the above technical solution, the replenishment unit is a fixed replenishment unit or a mobile replenishment unit, and is located at a feed end of the crawler-type automatic vending machine and abuts against the first transfer unit. The replenishment unit comprises a support frame, a replenishment crawler and a tray guide rail, wherein the support frame is located at a bottom of the replenishment unit, the replenishment crawler is located at an upper part of the support frame and could rotate forwardly and reversely, and the tray guide rail is arranged at one side of the replenishment crawler and fixed to the support frame.

In the above technical solution, each of the transfer units comprises a transfer container and a transfer platform, wherein the transfer platform is located inside the transfer container and is a platform having three vertical sliding pairs and capable of moving along three coordinate directions (X, Y and Z) under respective drive of three independent motors. A transfer belt conveyor capable of conducing forward and reverse transmission is arranged on the transfer platform; a tray guide rail for limiting and guiding trays is arranged at one side of an upper part of the transfer belt convey or close to a rear sealing plate; and the three independent motors and the transfer belt conveyor of the transfer platform are connected and controlled by the detection and control unit.

The transfer platform moves horizontally along an X axis; and the transfer platform drives goods trays on the transfer belt conveyor to draw close to a front container unit or a rear container unit, and then delivers the goods trays into the aisles through the transfer belt conveyor, or takes out the goods trays from the aisles.

The transfer platform moves longitudinally along a Y axis; and the transfer platform drives the goods trays on the transfer belt conveyor to be aligned with different aisles with the same height in the container unit, and then delivers the goods trays into the different aisles with the same height through the transfer belt conveyor, or takes out the goods trays from the different aisles with the same height.

The transfer platform moves up and down along a Z axis, and delivers the goods trays into goods shelves with different heights or takes out the goods trays from the goods shelves with different heights.

The operation action of the transfer platform and the transfer belt conveyor is automatically controlled by the detection and control unit.

In the above technical solution, the transfer container is composed of a framework and a sealing plate. The sealing plate comprises a front sealing plate, a rear sealing plate and a top sealing plate, wherein a set of payment system composed of a touch screen and a cash register is arranged on the front sealing plate, and a goods taking door is arranged below the touch screen. However, when a plurality of transfer units are arranged, the touch screen, the cash register and the goods taking door are not arranged on the front sealing plate of a first transfer cabinet; and a lifting guide rail is arranged on a column of the framework, and the transfer platform is in contact fit with the lifting guide rail and moves up and down along the lifting guide rail.

In the above technical solution, a height of the goods taking door shall be the most convenient for a customer to take. A lower edge of the goods taking door of a conventional commodity is set to be 0.8 m±0.5 m, while a height of a lower edge of the goods taking door of a heavy or large commodity is flush with a height of a conveying belt at an upper part of a belt conveyor in the container unit.

In the above technical solution, the transform platform comprises a winding machine, a cable, a transfer belt conveyor, a transverse mounting base, a transverse driving mechanism, a longitudinal support, a longitudinal guide rail, a lifting support and a longitudinal driving mechanism; the winding machine is installed in a middle position of a top of the framework of the transfer container; both ends of the cable are connected to both sides of the lifting support respectively; and the winding machine pulls the cable to drive the lifting support to move up and down along the lifting guide rail, thereby achieving lifting motion of the transfer platform; the transfer belt conveyor is located at an uppermost end of the transfer platform and is a bearing component of the whole transfer platform, and the transfer belt convey or operates forwardly and reversely to achieve forward and reverse conveying of the goods; the tray guide rail is arranged at one side of the transfer belt conveyor; the transverse mounting base is installed and fixed at a bottom of the transfer belt conveyor through bolts, the transverse driving mechanism is a linear motor; a mobile sliding block of the transverse driving mechanism is fixedly connected to the transverse mounting base through the bolts; the transverse driving mechanism drives the entire transfer belt conveyor to move horizontally back and forth by driving the transverse mounting base; both ends of the transverse driving mechanism are fixedly connected to the longitudinal support respectively; the longitudinal support is placed on the longitudinal guide rail and moves back and forth along the longitudinal guide; the longitudinal guide rail is installed and fixed on the lifting support; the longitudinal driving mechanism is a belt transmission mechanism; two belt wheels are installed and fixed on inner walls of both sides of the lifting support respectively; both ends of transmission belt are respectively connected to both ends of the longitudinal support; and the longitudinal driving mechanism drives the longitudinal support and the transfer belt conveyor to move back and forth longitudinally along the longitudinal guide rail by driving the transmission belt.

In the above technical solution, the goods taking door comprises a lifting door plate, a lifting motor and a fixed hinge base, wherein the lifting door plate is placed in a clamping groove of a goods taking door hole of the front sealing plate and is an electric lifting door plate, thereby achieving automatic opening and closing of the goods taking door under the control of the detection and control unit.

In the above technical solution, the container unit is composed of a container body, a multilayer drawer-type goods shelf and a belt conveyor arranged at a bottom of the container unit, but when a plurality of container units are arranged, the drawer-type goods shelf, rather than the belt conveyor, is arranged at the bottom of the container unit at an end.

In the above technical solution, the container body comprises a supporting framework, a container sealing plate and an aisle door, wherein the supporting framework comprises a column and a beam; the container sealing plate comprises the front sealing plate which is equipped with or not equipped with an insulating layer, the rear sealing plate, an upper sealing plate and a lower sealing plate; an air duct interface connected to an air duct at an end of an air conditioner is arranged on the rear sealing plate; the aisle door is arranged between two layers of beams at front and rear ends of the container body; a relatively closed space is formed inside the container body by the aisle door together with the front sealing plate, the rear sealing plate, the upper sealing plate and the lower sealing plate, and the aisle door is provided with an independent electric opening and closing mechanism automatically controlled by the detection and control unit; and the aisle door and the independent electric opening and closing mechanism of the aisle door are not arranged for the container body which has no insulation function.

In the above technical solution, the drawer-type goods shelf is installed in the container body and comprises a goods shelf drawer, a crawler-type aisle, a drawer lock and a tray guide rail; the goods shelf drawer is placed on the beam of the goods shelf; a goods shelf drawer panel is made of transparent material; a drawer lock is arranged on the goods shelf drawer panel; the crawler-type aisle is fixedly installed on the goods shelf drawer; each crawler-type aisle is arranged in parallel and independently equipped with an aisle drive motor; and the aisle drive motor is connected to the crawler-type aisle and drives the crawler-type aisle to do forward or reverse motion; and the tray guide rail is arranged at one side of each crawler-type aisle, the trays are reversely arranged on the crawler-type aisle along a motion direction in order, and commodities are placed in the trays.

In the above technical solution, each tray comprises a plurality of guide wheels and a tray box, wherein the guide wheels are uniformly distributed at a lower position of one side of the tray box; the tray box is a bearing unit of the goods; the guide wheels are matched with the tray guide rail and move freely along the direction of the tray guide rail; and the tray guide rail limits and guides the guide wheels and is parallel to a motion direction of the trays.

In the above technical solution, the belt conveyor is located in a middle position of a bottom in the container body, a support of the belt conveyor is fixedly installed on the beam at the bottom layer of the supporting framework, and the tray guide rail is arranged on the belt conveyor.

The length of the belt conveyor is equal to or slightly less than that of the container, and the width of the belt conveyor is greater than or equal to that of the commodity sold at the container; the tray guide rail is arranged at a side of the belt conveyor close to the rear sealing plate along the X axis to limit and guide the tray, and the length of the tray guide rail is consistent with that of the belt conveyor; and the conveying belt of the belt conveyor operates forwards to deliver the goods trays to the previous transfer unit, or operates reversely to deliver the goods trays to the next transfer unit.

In the above technical solution, the container unit and the transfer unit are made into an integrated structure, and a discharge end of the container unit is provided with a transfer unit.

In the above technical solution, a feed end sealing plate and a discharge end sealing plate are respectively arranged at a feed end and a discharge end of the crawler-type automatic vending machine, wherein the feed end sealing plate is fixedly installed outside a feed end cabinet of the first transfer unit; a stocking door is formed on the feed end sealing plate; a door hole is aligned with the replenishment crawler; the stocking door is opened and closed under the control of a detection and control system and does synergic motion with the replenishment crawler; and the discharge end sealing plate is installed outside an end of the automatic vending machine, and forms a closed whole with the feed end sealing plate, the transfer unit and the container unit.

The detection and control unit comprises a microcontroller and a wireless communication unit, wherein the microcontroller achieves two-way communication with the cloud management platform and the payment system through the wireless communication unit, uploads state information of the automatic vending machine, receives commands of the payment system and the cloud management platform, and controls operation of all units of the automatic vending machine.

The cloud management platform receives information uploaded by the detection and control unit and the payment system of each automatic vending machine, automatically inputs the information into a corresponding database respectively, monitors a selling condition of each automatic vending machine in real time, and monitors a stock condition on the aisle of each automatic vending machine and a guarantee period of the commodity. When the detection and control unit detects that the goods on an aisle are close to a lower limit of the stock or exceed the guarantee period, alarm information is issued, and operating personnel could replenish the goods in a targeted way according to the prompt of the platform, and take out defective commodities to replace the defective commodities with new goods.

The payment system is composed of the touch screen and the cash register with an embedded system. The touch screen and the cash register with the embedded system are connected to the payment platform and the cloud management platform; the touch screen is installed on each transfer unit for displaying the commodities of the corresponding container unit, so that customers could click on each touch screen to select the commodities matched with the container. A camera on the touch screen is configured to scan faces of the customers to complete the payment, or a two-dimensional code is generated by the touch screen on a screen for selecting the commodities for scanning the code for payment by the customer with a mobile phone, or the customer selects to carry out the cash payment through the cash register, and after the payment is completed, the payment system sends paid information of a commodity to the detection and control unit and the cloud management platform, the detection and control unit controls the transfer platform in the transfer unit to move to a crawler aisle in which the commodity is located and to be aligned with the crawler aisle, controls a crawler aisle motor to step forward to push up the goods trays to the transfer platform, and then controls the transfer platform to move to the goods taking door; and the detection and control system makes an indication signal to indicate the customers to take goods, thereby completing purchase operation.

An automatic vending method using the crawler-type automatic vending machine comprises:

(I) Replenishment:

The replenishment of the vending machine could be divided into empty tray output and goods adding, with specific operation as follows:

1) A replenisher scans an ID of the automatic vending machine with a mobile terminal; the mobile terminal is connected with the cloud management platform through a wireless network; and the cloud management platform retrieves the ID of the automatic vending machine to match with the tray and commodity data in the current vending machine, and then outputs a replenishment list of the vending machine to the mobile terminal;

2) The replenisher selects any replenished commodity according to the replenishment list and scans a barcode of the replenished commodity with the mobile terminal; the mobile terminal acquires a name, a production date, a manufacturer and other information of the commodity by scanning and uploads the information to a cloud server; and the cloud server synchronizes the data to the payment system of the vending machine;

3) The payment system checks whether the commodity placed currently is correct, and Step 4) is performed if yes, and if no, the vending machine makes an alarm prompt according to an error reason, prompting to rescan the correct commodity;

4) The payment system issues a mode conversion instruction to the detection and control system to convert a selling mode into a replenishment mode;

5) The detection and control system inquires the container and the aisle in which the replenished commodities are located, starts the transfer unit at a rear end of the container, and starts the transfer platform to move to the corresponding aisle along the X, Y and Z axes; the transfer belt conveyor on the transfer platform is aligned with the aisle; and meanwhile, the transfer belt conveyor and an aisle crawler are reversely started, the aisle crawler is reversely operated to deliver the empty trays on the aisle crawler into the transfer belt conveyor, a tray is dropped out when an aisle crawler motor goes back by a step pitch, and after the system detects that the trays are fully placed on the transfer belt conveyor or the empty trays on the aisle crawler are fully delivered out, the transfer belt conveyor and the aisle crawler are stopped, and the transfer platform is moved downwards, so that the transfer belt conveyor is aligned with a transmission belt at a bottom of the rear container unit. Meantime, all transfer platforms of the rear transfer unit are moved downwards, so that the transfer belt conveyor is aligned with the transmission belt at a lower part of the front container unit. Then, the transfer belt conveyor and the transmission belt are reversely started to deliver the trays to the transmission belt of the rear container unit; the transmission belt of the rear container unit delivers the trays to the next transfer platform, and then, delivers the trays to the transmission belt at a lower part of a next container unit by moving the transfer platform back and forth, and so on, until the trays are delivered to the replenishment crawler of the replenishment unit. If the empty trays on the aisle crawler are not fully dropped out, the above steps are repeated, until the empty trays on the aisle are fully transported to the replenishment crawler;

6) Goods adding: after the vending machine transports all the empty trays on the aisle corresponding to the commodities inside the container to the replenishment crawler, the replenisher puts the commodities in the empty trays one by one; one commodity is placed on each tray until the trays on the replenishment crawler are full; and then, the replenisher starts a replenishment procedure; the transfer belt conveyor on the transfer platform is aligned with the replenishment crawler; after the commodity is delivered to the transfer platform, the belt conveyor below the container is started; the transfer platform delivers the trays onto the belt conveyor; the conveying belt delivers the trays onto the next front transfer platform, and so on, until the trays are delivered to the transfer platform at a front end of the container on which the trays are placed; then, the transfer platform at the front end of the container on which the trays are placed moves to be aligned with the placed aisle closely; the transfer platform and the aisle crawler are started to deliver the trays into the aisle; and a tray is delivered into the aisle when the aisle crawler motor goes ahead by a step pitch. If the aisle is not full of the trays, the above process is repeated, until the aisle is full;

7) If the commodities correspond to a plurality of replenishment crawlers, the system continues to start a replenishment procedure of another belt, the empty trays on another aisle crawler are transported to the replenishment crawler successively, and the replenisher puts the commodities into the empty trays successively, and then starts a stock procedure. The above stock process is repeated, and so on, until the commodities are fully replenished; and then the replenisher scans another commodity; and the above processes are repeated in this way until all the commodities of the vending machine are fully replenished;

8) After the replenishment is completed, the payment system of the vending machine updates the latest state information (including the name, the code, the size, the weight, the production date, the price, the quantity, the aisle and other information of the sold commodities) of the current automatic vending machine, and synchronizes all information to the cloud management platform;

9) The payment system issues the mode conversion instruction to the detection and control system to convert the replenishment mode into the selling mode.

(II) Selling:

1) Sellable commodities in a current vending machine module are displayed on a display screen of the transfer unit;

2) The customer selects the name and quantity of the commodities in the display screen, and clicks OK;

3) The system judges whether the commodities selected by the user are sellable, and when the commodities are not sellable (the quantity is insufficient, discount conditions are not met, and instant faults of equipment are presented), a prompt is given, and the user modifies the choice or return to a home page; and if the commodities are sellable, a payment amount is displayed and a commodity payment code is generated;

4) Payment is conducted by scanning a face through a camera or scanning the commodity payment code with the mobile terminal by the user or in cash;

5) The prompt is given if the payment fails, and the user selects to pay again or returns to the home page;

6) If the payment is succeeded, a monitoring and control unit determines placing positions of the goods according to goods information inputted by the customer, including the name and the quantity, and then, controls the transfer platform to move along the X, Y and Z axes to arrive at a front end of the aisle for placing the goods and align with the aisle, and starts an aisle crawler machine and a transfer belt conveyor; the trays loaded with the goods are delivered onto the transfer platform from the aisle one by one, and a step pitch is made by the aisle crawler each time; and when the trays detected by the system fully arrive on the transfer platform, the belt stops transferring, the aisle crawler is started to go back, a back step pitch is consistent with the above step pitch of shipment, and meanwhile, the transfer platform is started to move along the X, Y and Z axes to deliver the trays to places near a goods taking window, the detection and control unit controls to open the goods taking door, the transfer platform delivers the trays to the goods taking door and prompts the customer to take the goods; after the customer takes away the goods from the trays, the goods taking door is closed, and the transfer platform goes back and moves down and is aligned with the conveying belt at the bottom of the container; the transfer belt conveyor and the conveying belt are reversely started; the empty trays are delivered to the conveying belt; after the empty trays are fully away from the transfer belt conveyor, the transfer belt conveyor is stopped; meanwhile, the transfer platform at the rear end of the container is synchronously started to move along the X, Y and Z axes to align with the conveying belt at the bottom of the container; the conveying belt and the transfer belt conveyor at the rear end are started; the empty trays are delivered onto the transfer belt conveyor at the rear end, and when the empty trays fully enter into the transfer platform, the conveying belt and the transfer belt conveyor at the rear end are stopped; the transfer platform at the rear end is started to be aligned with the aisle corresponding to the trays closely; then, the transfer belt conveyor is started, the empty trays are pushed to the aisle crawler, the aisle crawler is started to access the empty trays to the aisle, one empty tray is accessed to the aisle when the aisle crawler motor goes forward a step pitch, and when the trays are fully away from the transfer platform to enter into the aisle, the belt and the aisle crawler are stopped, and finally, the transfer platform at the rear end of the container returns to an original position;

7) If the commodities purchased by the customer are not shipped completely, the above shipment process is repeated until all commodities purchased by the customers are shipped completely, and the selling is completed;

8) After the selling is completed, the payment system updates the latest state information of the automatic vending machine, and synchronizes all the information to the cloud management platform.

(III) Fault Handling and Maintenance:

When the vending machine fails or needs to be maintained, the system would give an alarm signal, and a device administrator confirms the fault according to the alarm signal, and then correspondingly handles the fault in a targeted way;

1) Aisle fault: When an aisle in the container has a blocking phenomenon, the system would give the alarm signal, the administrator confirms the faulty aisle according to the alarm signal, opens the drawer lock of the drawer-type goods shelf on which the aisle is located, draws out the whole drawer-type goods shelf, and maintains or replaces the aisle, and after maintenance or replacement, the administrator reinserts the drawer-type goods shelf into the container, and then restarts the container system;

2) Expired goods: When the system detects that some goods in the container will be expired, the system would give the prompt signal; if there is only one container, based on the prompt signal, the administrator extracts the goods to be expired according to a goods fault handling process and adds new goods; and if the quantity of the containers is greater than 1, the administrator takes out all goods to be expired through a special taking procedure, and this process is consistent with the customer purchase process.

Compared to the Existing Art, the Present Invention has the Following Advantages and Beneficial Effects:

1. The present invention adopts modular design. Both the container unit and transfer unit are independent modules. The quantity and specifications of the container unit and the transfer unit can be freely selected in actual use according to kinds of goods sold, size of a site and other specific situations, and the specifications and the quantity of the shelf and the aisle crawler can be freely combined, thereby greatly improving the adaptability of the vending machine. Any commodity that enters into the container, regardless of the size and even fragile commodities, could be sold through the vending machine, and the vending machine has a wide selling range of the commodities;

2. All the processes of the present invention, including the replenishment, transfer, shipment and the like, are completed by the system automatically; the replenishment could be conducted without opening any components of the vending machine manually, and automatic real-time online monitoring and management could be performed on the entire system, thereby greatly saving manual labor and increasing the labor efficiency;

3. The present invention realizes first-in first-out circular sales and replenishment operation of commodities and goods, thereby guaranteeing the guarantee period of the commodities and quality controllability;

4. The height of a selling opening of the present invention meets the ergonomics; selling openings for bulky goods are low; and the height of the selling opening for small goods is near the height of a human waist, so the goods taking is very easy and convenient;

5. The transfer and transmission of all goods in the present invention are seamlessly and stably docked through the belt, without apparent vibration, impact and other phenomena in the process. Therefore, the present invention is applicable to goods with various natures and packaging; and the sellable goods have wide adaptability;

6. A series of trays with different specifications are arranged in the present invention. All the goods in the vending machine are placed in the trays and transported with the trays. Since all the trays have regular appearances, the detection and transportation are facilitated, thereby maximally improving the stability and reliability in the transportation process. The goods having various shapes and packaging have good adaptability, thereby greatly improving the adaptability of the vending machine;

7. The guide rail adapting to the trays is arranged at the same side of all conveying belts in the vending machine of the present invention, and is matched with the guide wheel on the tray, thereby guaranteeing that the trays move in strict accordance with a set direction in the transportation process; and with seamless dock of the guide rail between the belts, the transportation stability of the trays between the belts can be guaranteed well, thereby effectively guaranteeing the operation stability of the whole vending machine;

8. The vending machine of the present invention is equipped with the cloud management platform. The cloud management platform can perform the remote monitoring and management on all commodities of the vending machine, and can collect, manage and analyze the operation data of all vending machines in real time, thereby greatly optimizing and improving the equipment efficiency and reducing the management cost.

1—replenishment unit, 2A—transfer unit A, 3A—container unit A, 2B—transfer unit B, 3B—container unit B, 2C—transfer unit C, 3C—container unit C, 2Y—transfer unit Y, 3X—container unit X, 4—stocking door, 5—electric push rod, 6—electric push rod support, 7—front sealing plate, 8—detection and control unit, 9—rear sealing plate, 10—cloud management platform, 11—payment system, 325—tray;

110—support frame, 120—replenishment crawler, 130—tray guide rail;

201—transfer cabinet framework, 202—front sealing plate, 203—rear sealing plate, 204—lifting guide rail, 205—touch screen, 206—cash register, 207—top sealing plate, 210—transfer platform, 220—goods taking door;

211—winding machine, 212—cable, 213—transfer belt conveyor, 214—transverse mounting base, 215—transverse driving mechanism, 216—longitudinal support, 217—longitudinal guide rail, 218—lifting support, 219—longitudinal driving mechanism;

221—lifting door plate, 222—lifting motor, 223—fixed hinge base;

301—front sealing plate, 302—rear sealing plate, 303—top sealing plate, 304—bottom sealing plate, 310—container body, 311—container column, 312A—container beam A, 312B—container beam B, 312M—container beam M, 313—bottom container beam, 320A—drawer-type goods shelf A, 320B—drawer-type goods shelf B, 320M—drawer-type goods shelf M, 320C—drawer-type goods shelf C, 330—conveying belt;

321A—aisle door A, 321B—aisle door B, 322—goods shelf drawer, 323A—crawler-type aisle A, 323B—crawler-type aisle B, 323C—crawler-type aisle C, 323N—crawler-type aisle N, 324—drawer lock, 325A—tray A, 325B—tray B, 325C—tray C, 325S—tray S;

3251A—guide wheel A, 3251B—guide wheel B, 3251Z—guide wheel Z, 3252—tray box;

2—transfer unit, and 3—container unit.

DETAILED DESCRIPTION OF PREFERRED EMBODIMENTS

Embodiment 1: (a Plurality of Containers are Arranged)

Figure 1:
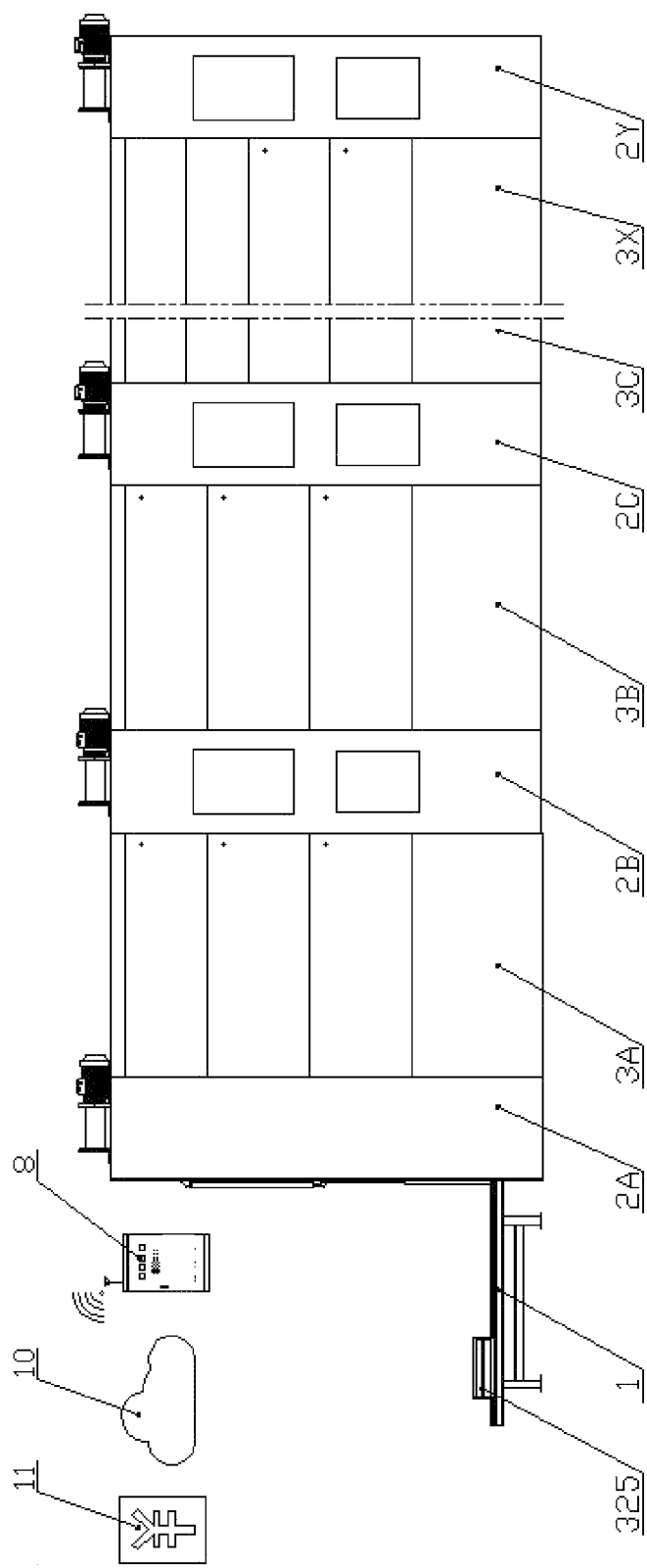
FIG. 1 is a structural schematic diagram of an automatic crawler-type automatic vending machine of the present invention.

The present invention relates to a crawler-type automatic vending machine. As shown in FIG. 1, the crawler-type automatic vending machine comprises a replenishment unit 1, transfer units 2A, 2B, 2C and . . . 2Y, container units 3A, 3B, 3C and . . . 3X, a detection and control unit 8, a cloud management platform 10, a payment system 11, a front sealing plate 7 and a rear sealing plate 9. The transfer units 2A, 2B, 2C . . . 2Y and the container units 3A, 3B, 3C . . . 3X are aligned and arranged along feed sides towards discharge sides successively and alternatively and connected together by bolts or buckles to form a large cabinet which is a main body of the vending machine; and all the transfer units 2A, 2B, 2C . . . 2Y and the container units 3A, 3B, 3C . . . 3X have the same height. The front sealing plate 7 is arranged outside the feed side of the first transfer unit 2A and is flush with an end surface of the transfer unit 2A; a stocking door 4 is arranged outside the front sealing plate 7, the lowest position of the stocking door 4 is slightly lower than the lowest receiving height of the first transfer unit 2A, and the size of a door hole is slightly greater than or equal to a maximum pass size of the goods; the stocking door 4 is hinged with an electric push rod 5 to control the opening and closing of the stocking door 4 through the electric push rod 5, the electric push rod 5 is hinged with an electric push rod support 6, and the electric push rod support 6 is fixed or welded on the front sealing plate 7 through the bolts. A rear sealing plate 9 is arranged outside the discharge end of the last transfer unit 2Y, and is flush with an end surface of the transfer unit 2Y; the replenishment unit 1 is located at a front end of the feed side of the first transfer unit 2A, is close to the front sealing plate 7 and is aligned with the front sealing plate 7; and the height of the replenishment unit 1 is consistent with the lowest receiving height of the transfer unit 2A. Regarding a detection and control unit 8, a plurality of sensors are arranged in the units for monitoring the state of the whole vending machine, and motion of actuators of the units is controlled by the detection and control unit 8; the cloud management platform 10, the payment system 11 and the detection and control unit 8 perform two-way communication through wireless communication; the cloud management platform 10 collects state information of the automatic vending machine and performs the remote control and management on the vending machine through the detection and control unit 8 and the payment system 11; and the payment system is an interactive window between the vending machine and the customer, and also manages commodity information and state of the vending machine.

Figure 2:
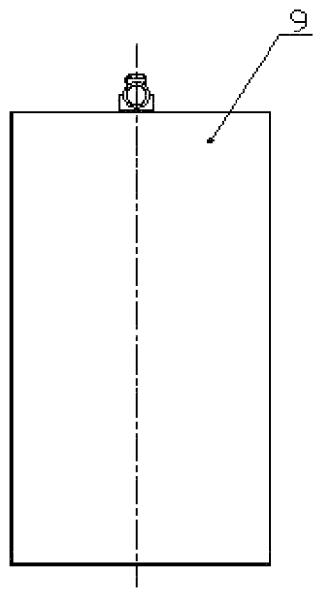
FIG. 2 is a right view of FIG. 1.

The replenishment unit 1 involved in the present invention, as shown in FIG. 2, comprises a support frame 110, a replenishment crawler 120 and a tray guide rail 130. The support frame 110 is located at a bottom to play a role of supporting and fixing; the replenishment crawler 120 is fixedly installed on the support frame 110 through bolts; and the tray guide rail 130 is arranged at one side of the replenishment crawler 120, and fixedly hung on the support frame of the replenishment crawler 120 through screw connection.

Figure 3:
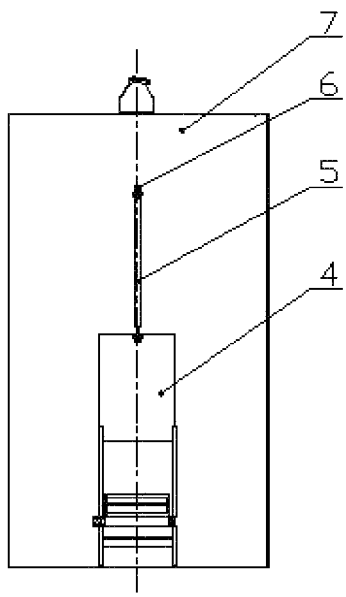
FIG. 3 is a left view of FIG. 1.
Figure 4:
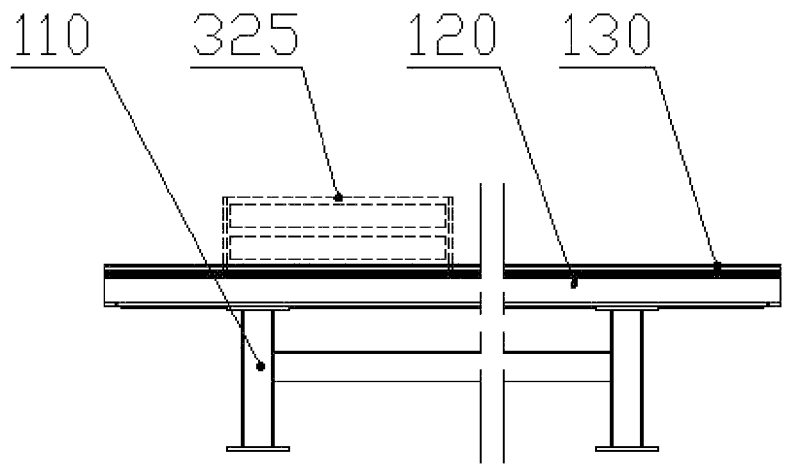
FIG. 4 is a structural schematic diagram of a replenishment unit of the present invention.
Figure 5:
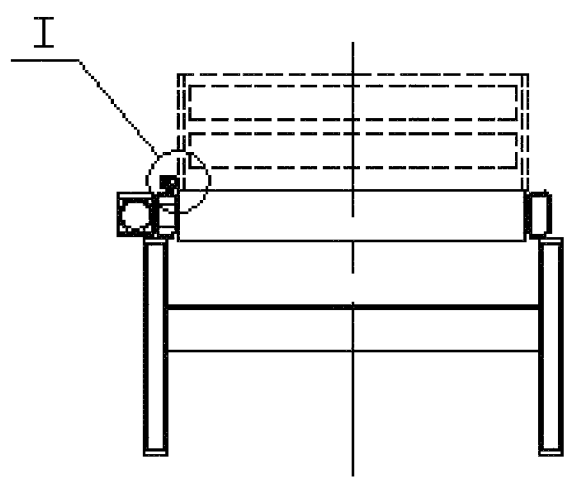
FIG. 5 is a left view of FIG. 4.
Figure 6:
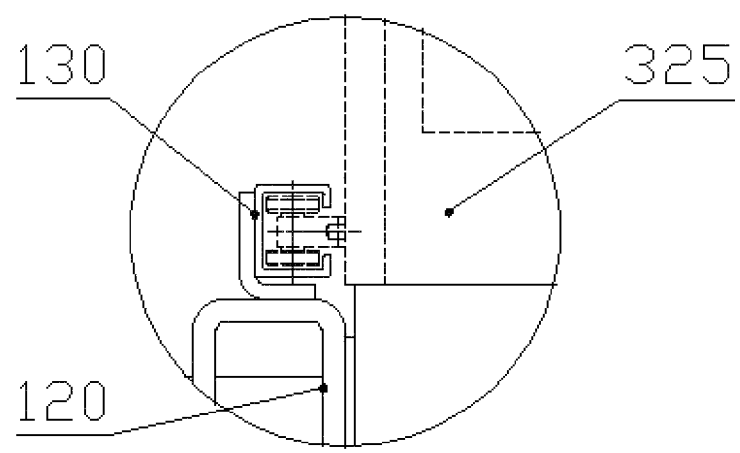
FIG. 6 is a partial enlarged drawing of FIG. 4.

The transfer unit involved in the present invention, as shown in FIG. 3, FIG. 4 and FIG. 5, mainly comprises a transfer cabinet framework 201, a transfer platform 210, goods taking door 220, a touch screen 205, a cash register 206, a front sealing plate 202, rear sealing plate 203 and a top sealing plate 207. The front sealing plate 202, the rear sealing plate 203 and the top sealing plate 207 are respectively arranged outside a front, a rear and a top of the transfer cabinet framework 201; a touch screen 205 and a cash register 206 are arranged at an upper part of the front sealing plate 202; a goods taking door 220 is arranged at a position below the touch screen 205 and the cash register 206, and can open and close a goods taking opening in the front sealing plate 202; four lifting guide rails 204 are respectively arranged on four columns of the transfer cabinet framework 201 and are fixedly connected to the transfer cabinet framework 201 through bolts; and the transfer platform 220 is located inside the transfer cabinet framework 201, is in contact fit with the lifting guide rails 204, and could make up and down movement along the lifting guide rails 204.

The transfer platform 210 involved in the present invention, as shown in FIG. 4, mainly comprises a winding machine 211, a cable 212, a transfer belt conveyor 213, a transverse mounting base 214, a transverse driving mechanism 215, a longitudinal support 216, a longitudinal guide rail 217, a lifting support 218 and longitudinal driving mechanism 219. The winding machine 211 is installed at a middle position of a top of the transfer cabinet framework 201; both ends of the cabinet 212 are respectively connected to both sides of the lifting support 218; the winding machine 211 pulls the cable 212 to drive the lifting support 218 to move along the lifting guide rail 204 up and down, thereby achieving lifting motion of the transfer platform 210; the transfer belt conveyor 213 is located at au uppermost end of the transfer platform 210 and is a bearing component of the whole transfer platform 210, which could rotate forwardly and reversely, thereby achieving forward and reverse transportation of the goods; a tray guide rail 130 is arranged at one side of the transfer belt conveyor 213; the transverse mounting base 214 is installed and fixed at a bottom of the transfer belt conveyor 213 through the bolt; the transverse driving mechanism 215 is a linear motor; a mobile sliding block of the transverse driving mechanism 215 is fixedly connected to the transverse mounting base 214 through the bolt and drives the transfer belt conveyor 213 to move back and forth transversely by driving the transverse mounting base 214; both ends of the transverse driving mechanism 215 are fixedly connected to the longitudinal support 216 respectively; the longitudinal support 216 is placed on the longitudinal guide rail 217 and could move back and forth along the longitudinal guide rail 217; the longitudinal guide rail 217 is installed and fixed on the lifting support 218; the longitudinal driving mechanism 219 is a belt transmission mechanism; two belt wheels are installed and fixed on inner walls of both sides of the lifting support 218 respectively; both ends of transmission belt are respectively connected to both ends of longitudinal support 216; and the longitudinal driving mechanism could drive the longitudinal support 216 and the transfer belt conveyor 213 to move back and forth longitudinally along the longitudinal guide rail 217 by driving the transmission belt.

The goods taking door 220 involved in the present invention, as shown in FIG. 5, comprises a lifting door plate 221, a lifting motor 222 and a fixed hinge base 223. The lifting door plate 221 is an electric lifting door plate, and achieves automatic opening and closing under the control of the detection and control unit. As an embodiment of the present invention, the lifting door plate 221 is placed in a clamping groove of a goods taking door hole of the front sealing plate 202, and an upper end thereof is hinged with the lifting motor 222; the other end of the lifting motor 222 is hinged with the fixed hinge base 223; and the fixed hinge base 223 is welded on a beam of the transfer container framework 201. The lifting motor 222 could be the electric push rod or the linear motor, and drives the lifting door plate 221 to move up and down by making telescopic motion, thereby achieving automatic opening and closing of the goods taking door 220.

Figure 7:
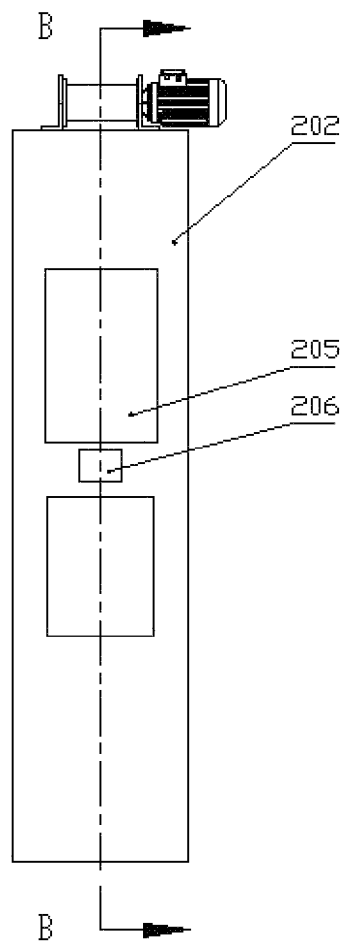
FIG. 7 is a structural schematic diagram of a transfer unit of the present invention.

The container unit 3 involved in the present invention, as shown in FIG. 6, FIG. 7, FIG. 8 and FIG. 9, comprises a container body 310, a front sealing plate 301, a rear sealing plate 302, a top sealing plate 303, a bottom sealing plate 304, several layers of drawer-type goods shelves 320A, 320B and . . . 320M and a conveying belt 330. The front sealing plate 301 and the rear sealing plate 302 are respectively installed at an outermost side of front and rear sides of the container body 310; the top sealing plate 303 is installed outside a top of the container body 310, and the bottom sealing plate 304 is installed at a bottom of a bottom container beam 313 of the container body 310; an air duct joint is arranged on the rear sealing plate 302 and is connected to an air inlet pipe and an air outlet pipe at the end of an air conditioner; the container body 310 is a supporting structure of the container unit 3 and is mainly composed of a container column 311, several layers of container beams 312A, 312B and . . . 312M and a bottom container beam 313. A series of equidistant mounting holes (or catching grooves) are formed in the container column 311; the container beams 312A, 312B and . . . 312M are connected to the container column 311 through the bolt (or buckle), and the position of each layer could be flexibly adjusted according to an actual need; and the bottom container beam 313 is welded with the container column 311, and located at a bottom of the container body 310. The drawer-type goods shelves 320A, 320B and . . . 320M are placed on the container beams 312A, 312B and . . . 312M respectively, and are corresponding thereto in the quantity and positions; the conveying belt 330 is located at a middle position of a bottom of the container body 310, and installed and fixed on the bottom container beam 313; for the container 3X at the end, as shown in FIG. 7, the conveying belt 330 is replaced with the drawer-type goods shelf 312C, to improve the utilization efficiency of the device. When the container unit 3 needs temperature control, aisle doors 321A and 321B are arranged between all container beams 312A, 312B and . . . 312M and 313; the aisle doors 321A and 321B are arranged at the feed end and the discharge end respectively and fixed to the container beam, and the length is just equal to the height of a gap in a middle of two layers of beams. A closed space inside the corresponding shelf is formed by the aisle doors 321A and 321B, the front sealing plate 301, the rear sealing plate 302, the top sealing plate 303 and the bottom sealing plate 304; the aisle doors 321A and 321B could be overturned externally by 90 degrees under the drive of the motor; and based on a heat insulation need, insulating layers are arranged on the aisle doors 321A and 321B, the front sealing plate 301, the rear sealing plate 302, the top sealing plate 303 and the bottom sealing plate 304.

Figure 8:
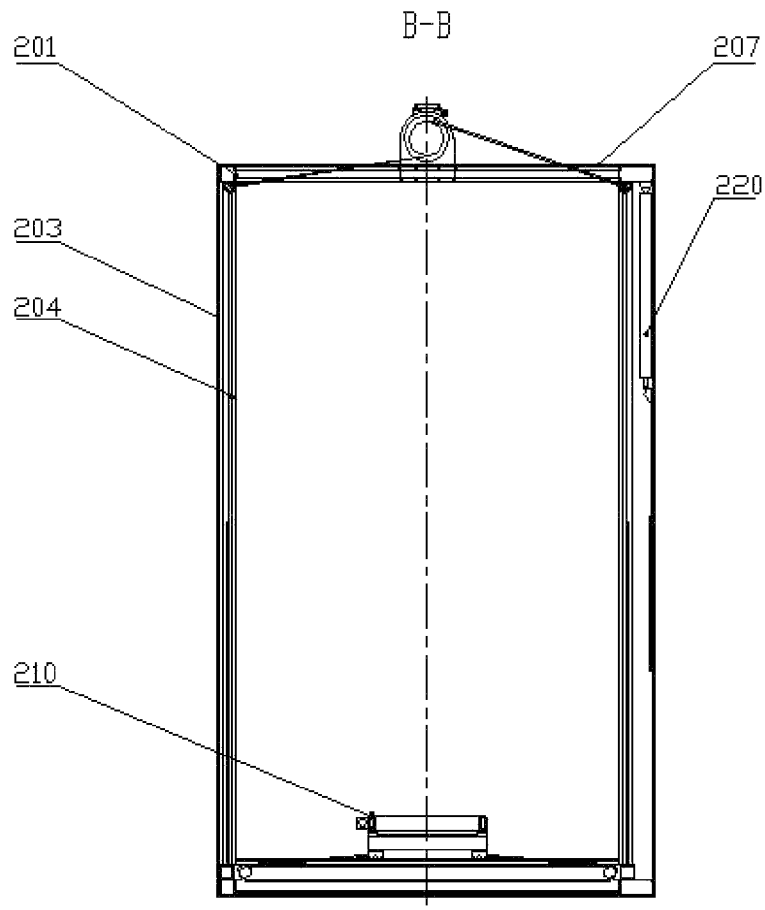
FIG. 8 is a B-B view of FIG. 7.

The drawer-type goods shelves 320A, 320B and . . . 320M involved in the present invention are shown in FIG. 8, each of which comprises an aisle drawer 322, a plurality of crawler-type aisles 323A, 323B and . . . 323N and a drawer lock 324. The crawler-type aisles 323A, 323B and . . . 323N have the same length, the width could be different, and a specific value of N is determined according to the sum of the width of the crawler-type aisles 323A, 323B and . . . 323N and the width of the aisle drawer. The crawler-type aisles 323A, 323B and . . . 323N are uniformly distributed on the aisle drawer 322, and connected and fixed with the aisle drawer 322 through the bolts; a plurality of trays 325A, 325B and . . . 325S are placed on the crawler-type aisles 323A, 323B and . . . 323N respectively; the width of the trays 325A, 325B and . . . 325S is consistent with the width specification of the corresponding crawler-type aisles 323A, 323B and . . . 323N, and the length of the trays 325A, 325B and . . . 325S has a series of specifications according to the requirements of placed goods; a drawer lock 324 is installed on a panel of the aisle drawer 322, and when the aisle drawer 322 is inserted in the container body 310 in place, the aisle drawer 322 is locked together with the container body 310 as a whole through the drawer lock 324, and could be unlocked with a key.

Figure 9:
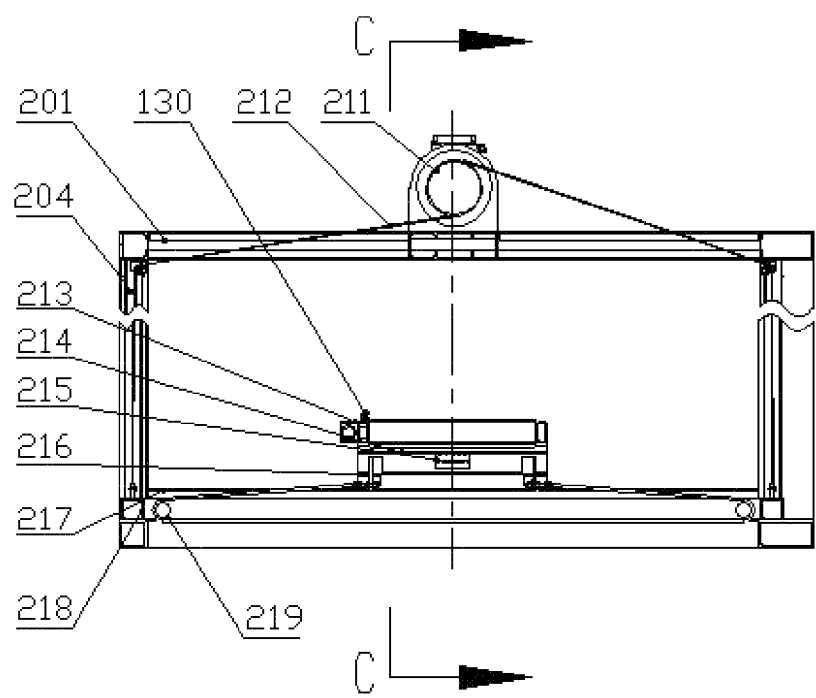
FIG. 9 is a schematic diagram illustrating a structure of a transfer platform of the present invention.
Figure 10:
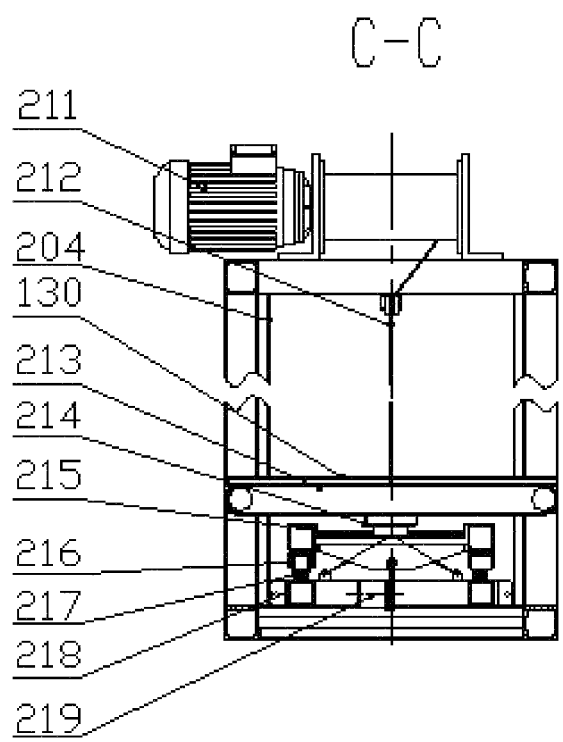
FIG. 10 is a C-C view of FIG. 9.

The tray 325 involved in the present invention, as shown in FIG. 9, comprises a plurality of guide wheels 3251A, 3251B and . . . 3251Z and a tray box 3252. The guide wheels 3251A, 3251B and . . . 3251Z are uniformly distributed at a lower position at one side of the tray box 3252, and fixedly connected into a whole through screws; the tray box 3252 is a bearing unit of the goods, and could have a plurality of different specifications according to a need of loaded goods; and in a process of conveying the tray 325, the guide wheels 3251A, 3251B and . . . 3251Z are matched with the tray guide rail 130 and freely move along the guide rail, and the tray guide rail 130 limits and guides the guide wheels 3251A, 3251B . . . 3251Z.

The detection and control unit 8 comprises a microcontroller and a wireless communication unit. The microcontroller achieves two-way communication with the cloud management platform 10 and the payment system 11 through the wireless communication unit, uploads state information of the automatic vending machine, receives commands of the cloud platform and the payment system, and controls operation of all units of the automatic vending machine, thereby achieving replenishment and selling; and the cloud management platform 10 could receive information uploaded by the detection and control unit 8 and the payment system 11 of the automatic vending machine, automatically inputs the information into the corresponding database respectively, monitors a selling condition of each automatic vending machine in real time, and monitors the stock condition on each aisle of each automatic vending machine and a guarantee period of the commodity. When the system detects that the goods on an aisle are close to a lower limit of the stock, or has a problem of exceeding the guarantee period, the system issues alarm information, and the operating personnel could replenish the goods in a targeted way according to a prompt of the platform, and take out defective commodities and replace with the new goods, etc.

The payment system 11 is composed of a touch screen 205 and a cash register 206 with an embedded system. The touch screen 205 and the cash register 206 with the embedded system are connected to the payment platform (a bank, WeChat, Aplipay, Baidu Wallet, etc.) and the cloud management platform 10, and installed on each transfer unit (2A, 2B, 2C . . . 2Y) for displaying the commodities of the corresponding container unit, so that the customer could click on each touch screen to select the commodities matched with the container. A camera on the touch screen 205 is configured to scan the face of the customer to complete the payment, a two-dimensional code is also generated by the touch screen 205 on a screen for selecting the commodities for scanning the code for payment by the customer with a mobile phone, and the customer also could select to carry out the cash payment through the cash register 206; after the payment is completed, the payment system 11 sends paid information of the commodity to the detection and control unit 8 and the cloud management platform 10; the detection and control unit 8 controls the transfer platform 210 in the transfer unit to move to a crawler aisle on which the commodity is located and to be aligned with the crawler aisle, controls a crawler aisle motor to step forward to push up the goods trays to the transfer platform 210, and then controls the transfer platform to move the goods taking door 220, and makes a goods taking prompt to hint the customer to take goods, thereby completing purchase operation.

A workflow of the automatic vending machine involved by the present invention is divided into two parts, i.e. replenishment and selling, specifically as follows.

1. The replenishment method is as follows:

The vending machine replenishment could be divided into empty tray output and goods adding, specifically as follows:

1) A replenisher scans an ID of the automatic vending machine with a terminal (such as a mobile phone); the terminal is connected with the cloud management platform 10 through a wireless network, such as GPRS, 3G, 4G, 5G and WIFI; and the cloud management platform 10 retrieves the ID of the automatic vending machine to match with the tray and commodity data in the current vending machine, and then outputs a replenishment list of the vending machine to the terminal;

2) The replenisher selects any replenished commodity according to the replenishment list and scans a barcode of the replenished commodity with the terminal (such as a mobile phone); the terminal acquires a name, a production date, a manufacturer and other information of the commodity by scanning, and uploads the information to cloud management platform 10; and the cloud management platform 10 synchronizes the data to the payment system 11 of the vending machine;

3) The payment system 11 checks whether the commodity placed currently meets the requirement, and Step 4) is performed if yes, and if no, the vending machine makes an alarm prompt (wrong specification, sold out, expired, wrong commodity, etc.) according to an error reason, prompting to rescan the correct commodity;

4) The payment system 10 issues a mode conversion instruction to the detection and control unit 8 to convert a selling mode into a replenishment mode;

5) The detection and control unit 8 inquires the container 3A, 3B, 3C or . . . 3X and the aisle corresponding to the replenished commodities;

6) The transfer platform 210 of the transfer unit 2B, 2C or . . . 2Y at the rear end of the container is started;

7) The transfer platform 210 is moved to be aligned with the corresponding crawler-type aisle 323A, 323B, 323C or . . . 323N;

8) The transfer belt conveyor 213 and the crawler-type aisle 323A, 323B, 323C or . . . 323N are reservedly started; the empty trays on the aisle crawler are delivered into the transfer belt conveyor 213 one by one by the crawler-type aisle 323A, 323B, 323C or . . . 323N, and a tray is dropped out when the crawler-type aisle 323A, 323B, 323C or . . . 323N goes back by a step pitch;

9) The system stops the transfer belt conveyor 213 after detecting that the trays have been fully placed on the transfer belt conveyor 213 or the empty trays on the aisle crawler have been completely delivered out;

10) If the corresponding container is not the first container 3A, Step 11) is performed, and if it is the first container 3A, Step 15) is performed;

11) The transfer platform 210 moves downward until the transfer belt conveyor is aligned with the transmission belt 330 at the bottom of the rear container unit;

12) The system moves downward the transfer platform 210 of all rear transfer units of the container, so that the transfer belt conveyor 213 is aligned with the transmission belt 330 at a lower part of the front container unit;

13) The detection and control system reversely starts the transfer belt conveyor 213 and conveying belt 330, delivers the trays 325 into the transmission belt of the rear container unit, and delivers the trays to the transmission belt 210 at a lower part of a next container unit by moving the replenishment platform back and forth;

14) Operation is made like this until the trays are delivered onto the transfer platform of the first transfer unit 2A;

15) The transfer platform 210 moves backward to be aligned with the replenishment crawler 120; the replenishment crawler 120 and the transfer belt conveyor 213 of the first transfer unit are reversely started; and the trays 325 are transported onto the replenishment crawler;

16) If the empty trays on the aisle crawler are not fully dropped out, Steps 6)~15) are repeated until the empty trays on the aisle are fully transported onto the replenishment crawler;

17) The replenisher puts the goods in the empty trays one by one; and one of the goods is placed on one tray until the replenishment crawler are full of the trays;

18) The replenisher starts a replenishment procedure, and the transfer belt conveyor 213 on the transfer platform 210 is aligned with the replenishment crawler 120;

19) The transfer belt conveyor 213 and the replenishment crawler 120 are started to deliver the goods onto the transfer belt conveyor 213;

20) The transfer belt conveyor 213 below the container is started, and the transfer platform 210 delivers the trays 325 onto the transfer belt conveyor 213;

21) The conveying belt 330 delivers the trays to the next front transfer platform 210, and so on, until the trays are delivered to the transfer platform at the rear end that the container is placed;

22) The rear transfer platform 210 of the contained is moved, so as to be aligned with the corresponding crawler-type aisle 323A, 323B, 323C or . . . 323N;

23) The transfer belt conveyor 213 and the crawler-type aisles 323A, 323B, 323C or . . . 323N are started to deliver the trays 325 to the corresponding crawler-type aisle 323A, 323B, 323C or . . . 323N, and one tray is delivered into the crawler-type aisle when each crawler-type aisle goes forward by a step pitch.

24) After the trays on the transfer belt conveyor 213 are fully delivered into the crawler-type aisle, the transfer belt conveyor is stopped;

25) If such goods correspond to a plurality of replenishment crawlers, Steps 6)~24) are repeated, and so on until such goods are fully replenished;

26) The replenisher scans another commodity, Steps 2)~25) are repeated in this way until the goods are fully replenished.

27) After the replenishment is completed, the payment system of the vending machine updates the latest state information of the current automatic vending machine, including a name, a code, a size, a weight, a production date, a price, a quantity, the aisle and other information of the sold commodities, and synchronizes all the information to the cloud management platform;

28) The payment system issues the mode conversion instruction to the detection and control system to convert the replenishment mode into the selling mode.

2. Selling:

1) Sellable commodities in a current vending machine module are displayed on a display screen of the vending machine.

2) The customer selects the name and quantity of the commodities in the display screen of the vending machine, and clicks OK.

3) The system judges whether the commodities selected by the user are sellable, and when the commodities are not sellable (for example, the quantity is insufficient, discount conditions are not met, and instant faults of equipment are presented), a prompt is given, and the user modifies the choice or returns to a home page; and if the commodities are sellable, a payment amount is displayed and a commodity payment code is generated.

4) The user scans the commodity payment code with the mobile terminal or pays in cash.

5) The prompt is given if the payment fails, and the user selects to pay again or returns to the home page.

6) If the payment is succeeded, a control system determines a placing position of the goods according to goods information inputted by the customer, including the name and the quantity, 7) The detection and control system 8 controls the transfer platform 210 of the transfer unit at a front end of the corresponding container to arrive at the front end of the crawler-type aisle 323 that the goods are placed and to be aligned with the crawler-type aisle 323;

8) The crawler-type aisle 323 and the transfer belt conveyor 213 are started; the trays 325 loaded with the goods are delivered onto the transfer belt conveyor 213 one by one; and one tray is pushed to the transfer belt conveyor 213 when the motor of the crawler-type aisle goes forward by a step pitch each time;

9) When the trays 325 detected by the system fully arrive on the transfer belt conveyor 213, the transfer belt conveyor 213 is stopped, and the crawler-type aisle 323 goes back by a step pitch;

10) The transfer platform 210 is started to deliver the trays 325 to positions near a goods taking window;

11) The goods taking door 220 is opened, and the transfer platform 210 delivers the trays 325 to the goods taking door 220 and prompts the customer that the goods can be taken;

12) After the customer takes away the goods from the trays, the goods taking door 220 is closed, and the transfer platform 210 goes back and is aligned with the conveying belt 330 at the bottom of the container;

13) The transfer belt conveyor 213 and the conveying belt 330 are reversely started, and the empty trays 325 are delivered to the conveying belt 330;

14) After the empty trays 325 are fully away from the transfer belt conveyor 213, the transfer belt conveyor 213 and the conveying belt 330 are stopped;

15) The transfer platform at the rear end of the container is started to be aligned with the conveying belt at the bottom of the container;

16) The conveying belt and the transfer belt conveyor at the rear end are started, and the empty trays are delivered onto the transfer belt conveyor at the rear end;

17) When the empty trays fully enter into the transfer platform, the conveying belt and the transfer belt conveyor at the rear end are stopped;

18) The transfer platform at the rear end is started to be aligned with the aisle corresponding to the trays;

19) The transfer belt conveyor is started, and the empty trays are pushed to the aisle crawler;

20) After the trays are fully away from the transfer platform, the transfer belt conveyor is stopped, and the aisle crawler goes ahead by a step pitch;

21) The transfer platform at the front end of the container returns to an original position;

22) After selling is completed, the payment system updates the latest state information of the automatic vending machine, and synchronizes all the information to the cloud management platform.

Embodiment 2: (Only One Container is Arranged)

Figure 11:
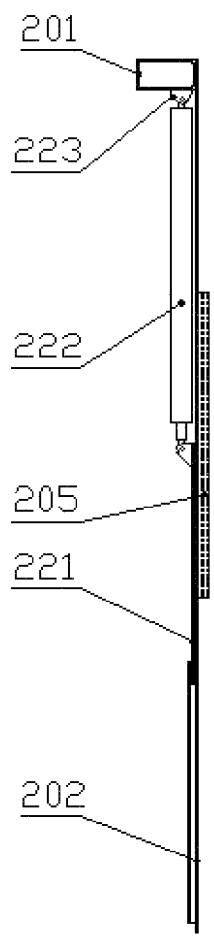
FIG. 11 is a structural schematic diagram of a goods taking door of the present invention.
Figure 12:
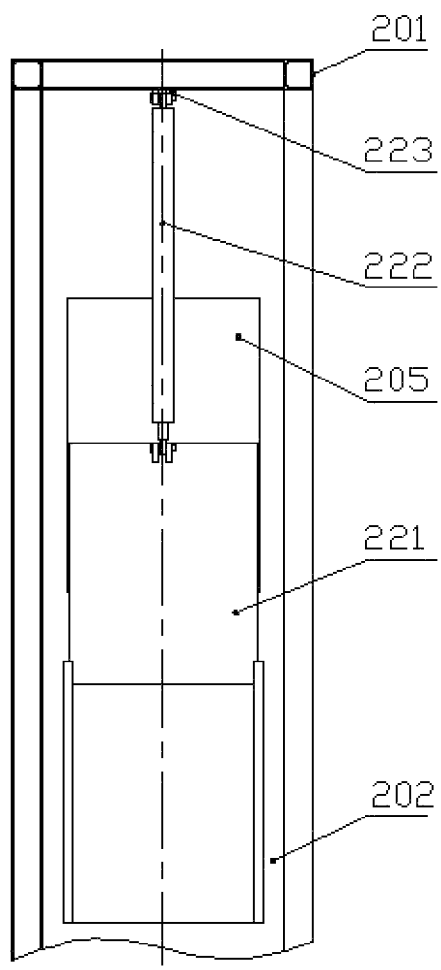
FIG. 12 is a left view of FIG. 11.
Figure 13:
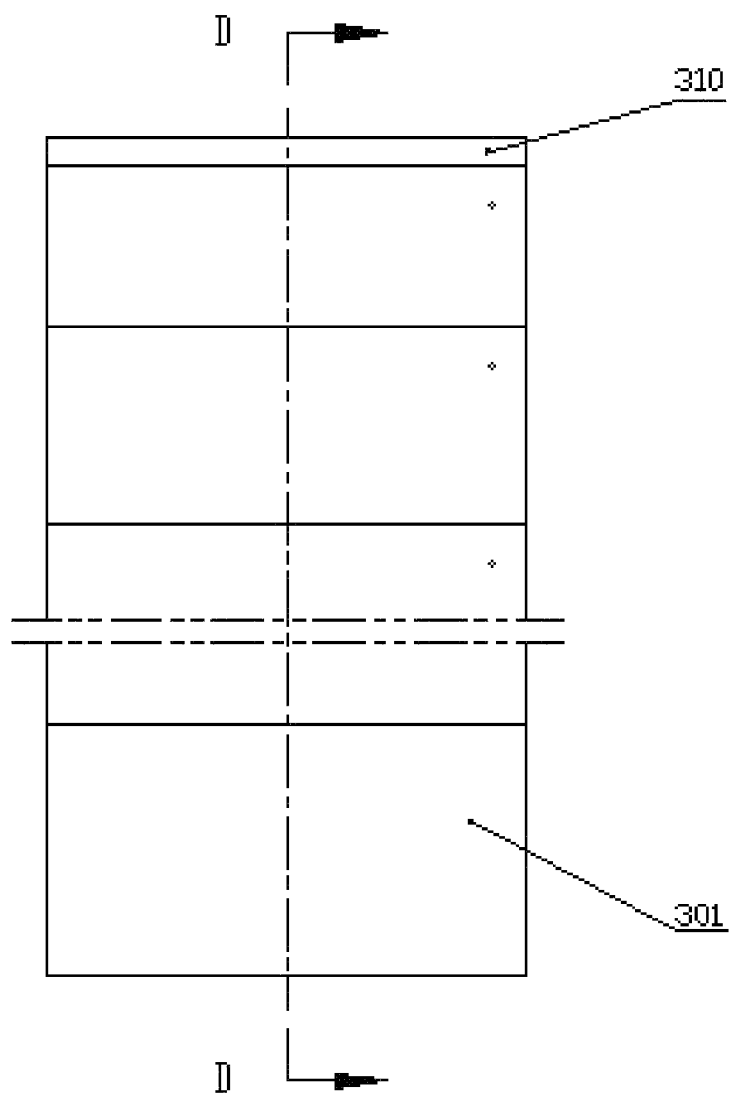
FIG. 13 is a structural schematic diagram of a container unit of the present invention.
Figure 14:
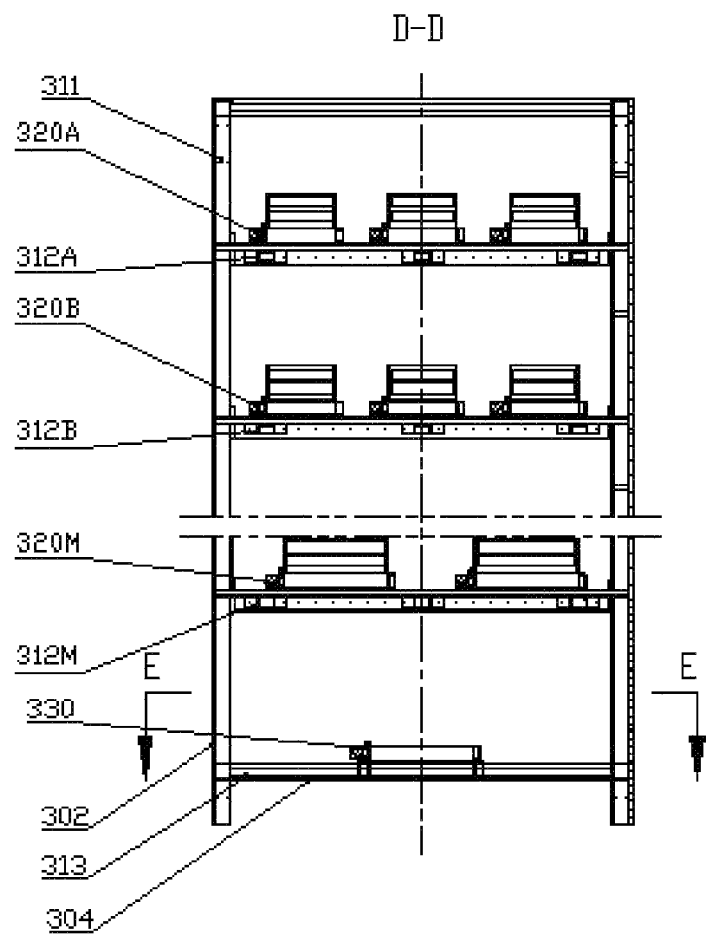
FIG. 14 is a D-D view of FIG. 13.
Figure 15:
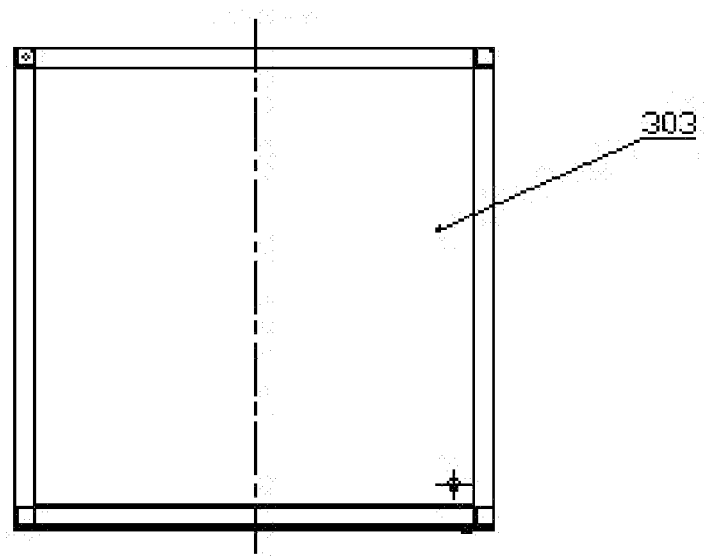
FIG. 15 is a top view of FIG. 13.
Figure 16:
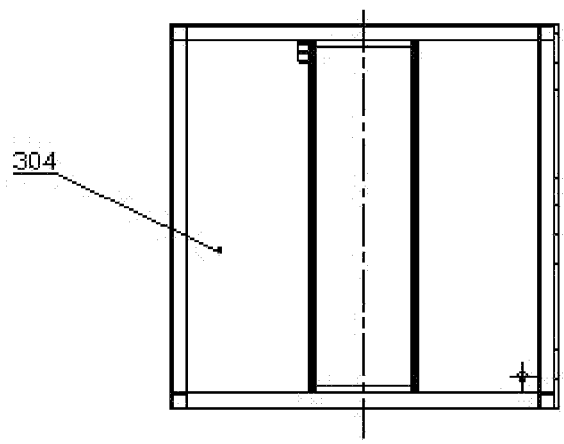
FIG. 16 is an E-E view of FIG. 13.
Figure 17:
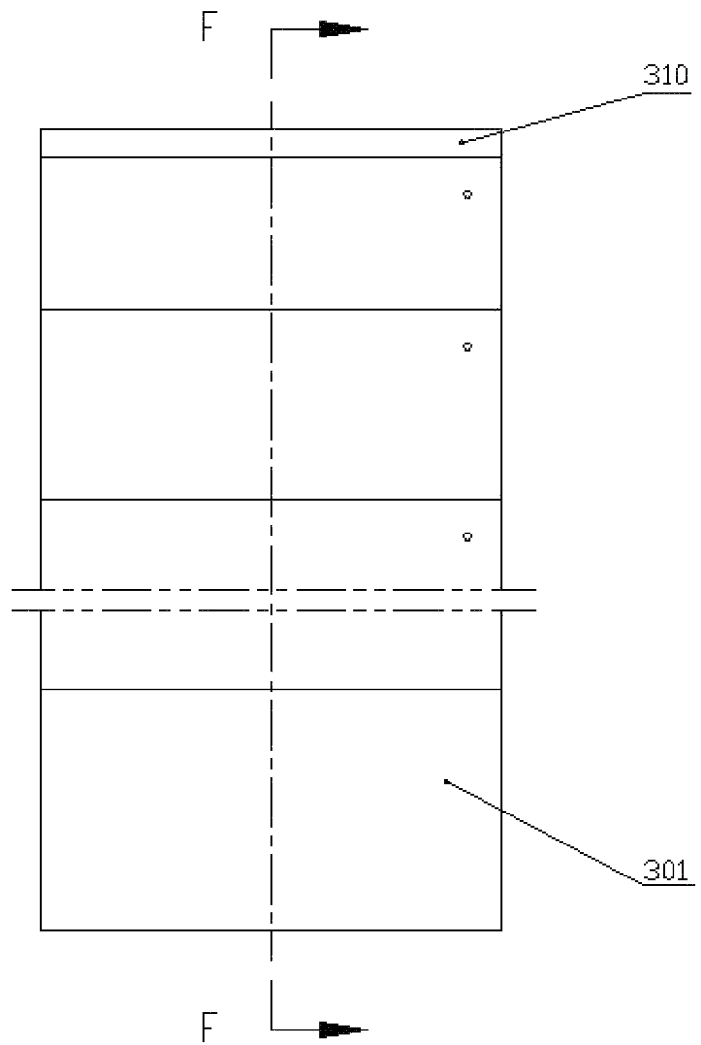
FIG. 17 is a structural schematic diagram of a container unit at an end of the present invention.
Figure 18:
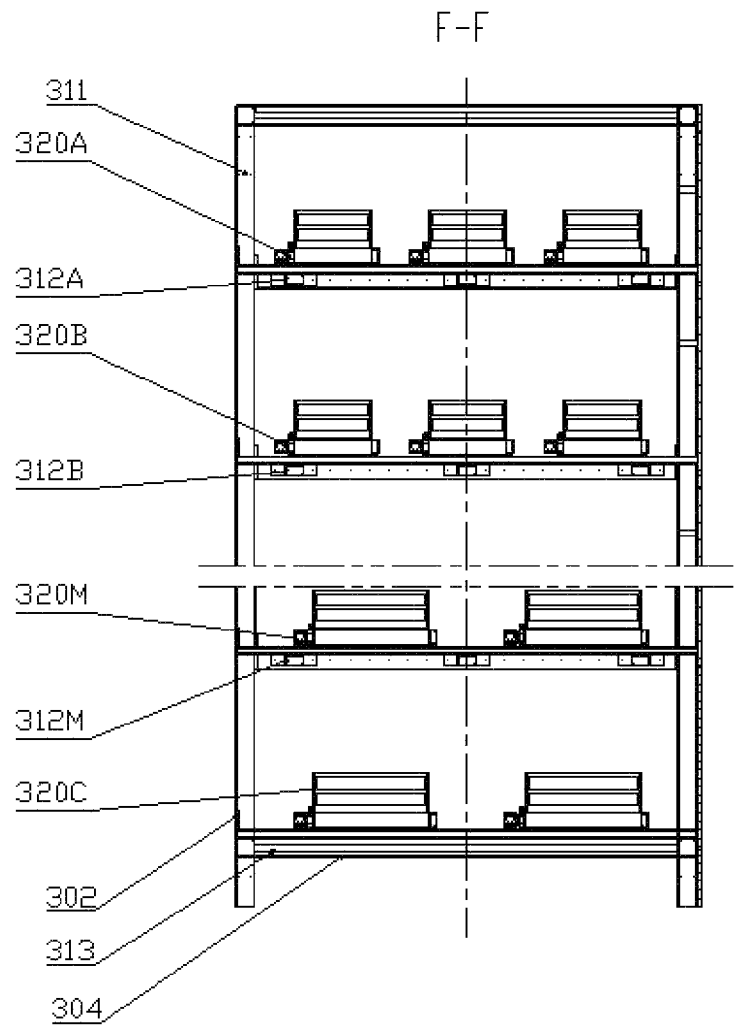
FIG. 18 is an F-F view of FIG. 17.
Figure 19:
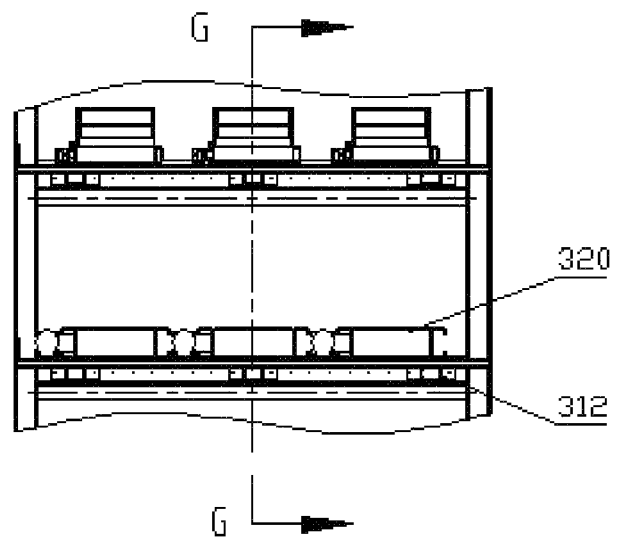
FIG. 19 is a local structural schematic diagram of a container unit with temperature control in the present invention.
Figure 20:
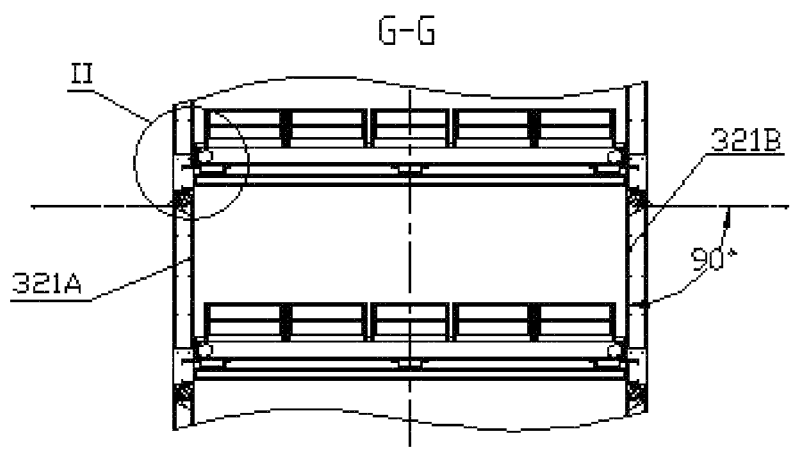
FIG. 20 is a G-G view of FIG. 19.
Figure 21:
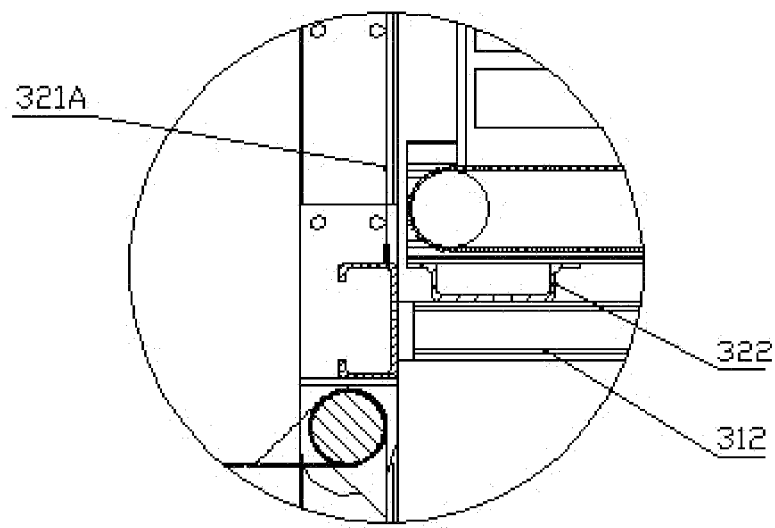
FIG. 21 is a partial enlarged drawing of FIG. 20.
Figure 22:
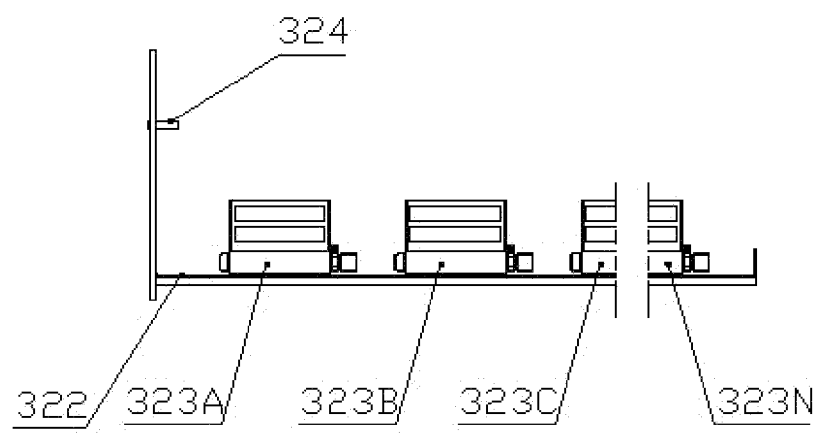
FIG. 22 is a structural schematic diagram of a drawer-type goods shelf of the present invention.
Figure 23:
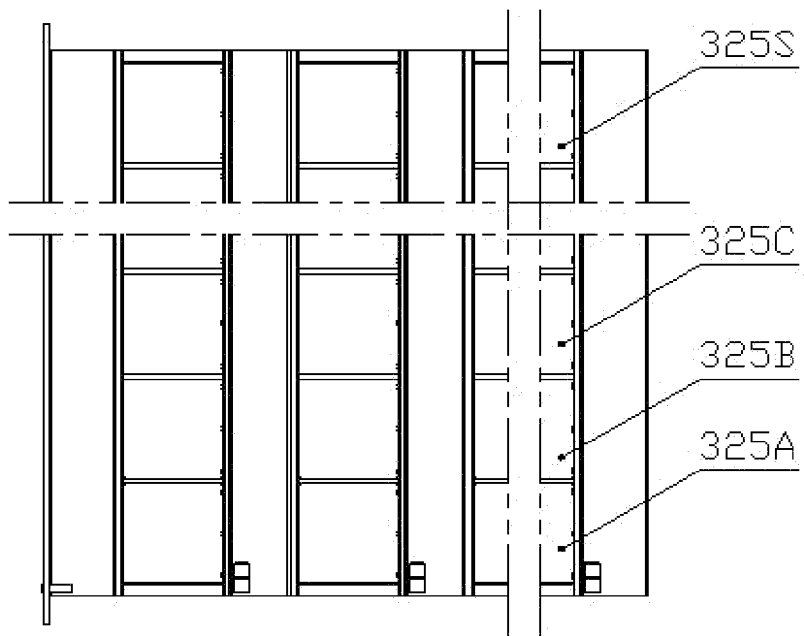
FIG. 23 is a top view of FIG. 22.
Figure 24:
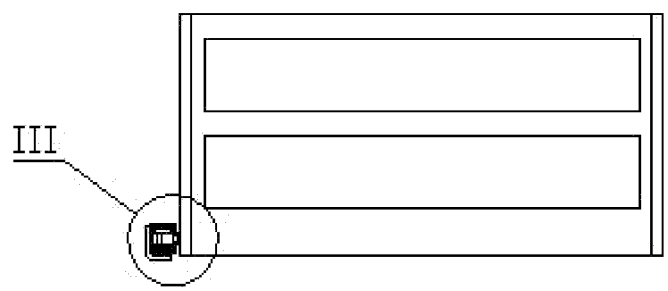
FIG. 24 is a structural schematic diagram of a tray of the present invention.
Figure 25:
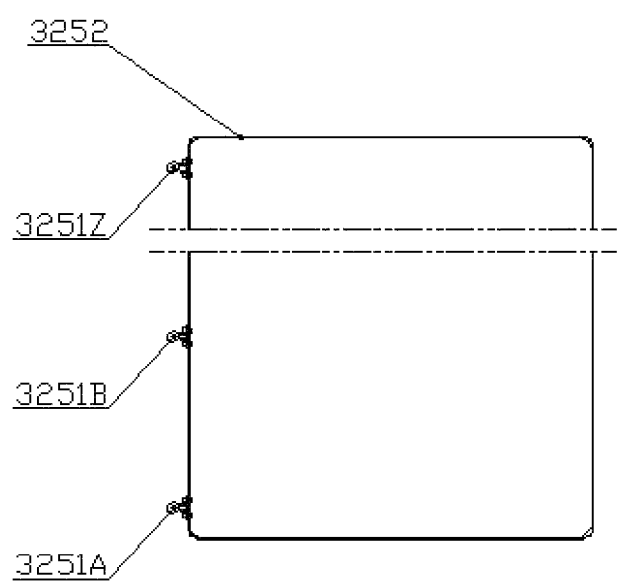
FIG. 25 is a top view of FIG. 24.
Figure 26:
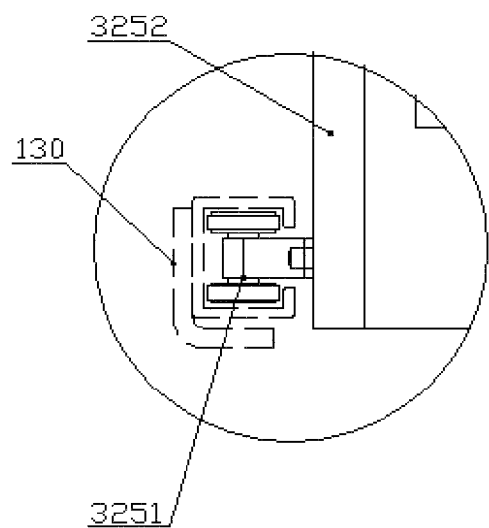
FIG. 26 is a partial enlarged drawing of FIG. 24.
Figure 27:
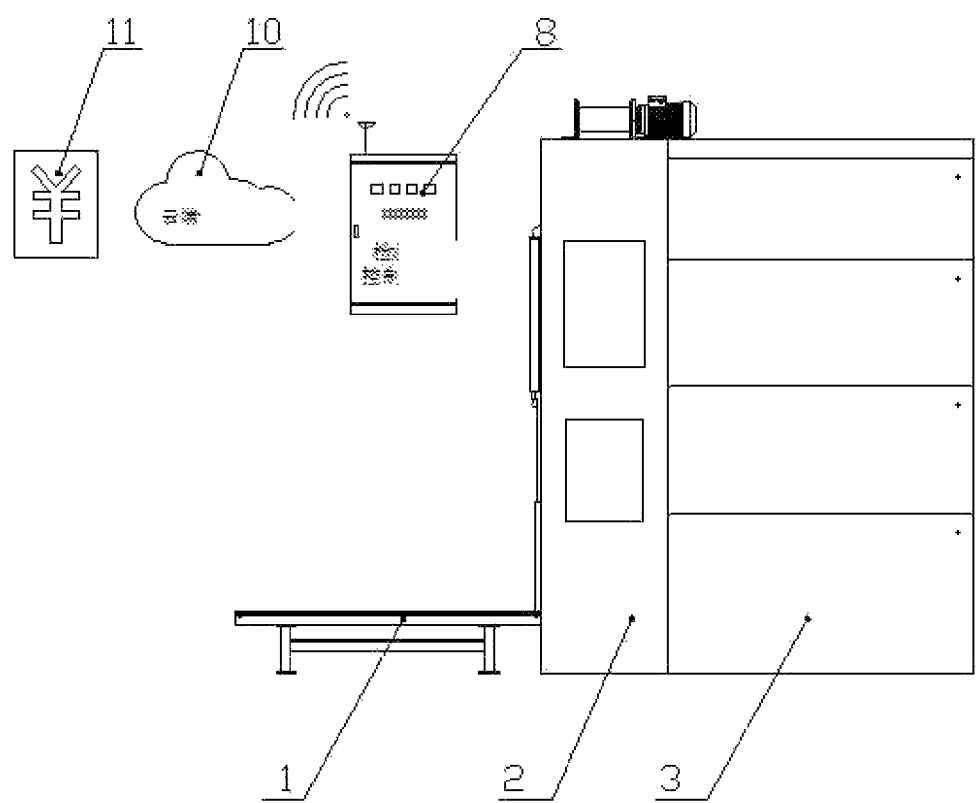
FIG. 27 is a structural schematic diagram of an application of a single container of the present invention.
Figure 28:
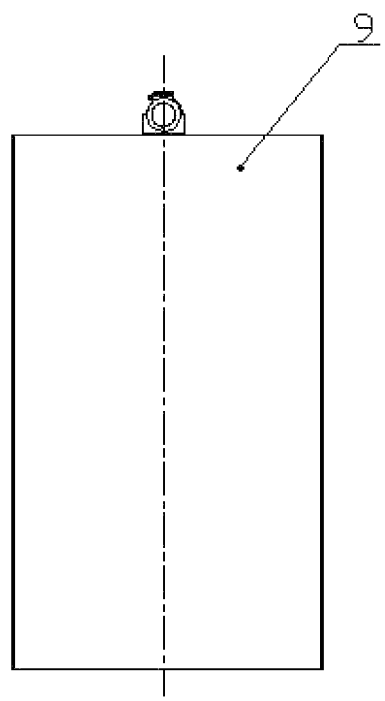
FIG. 28 is a right view of FIG. 27.
Figure 29:
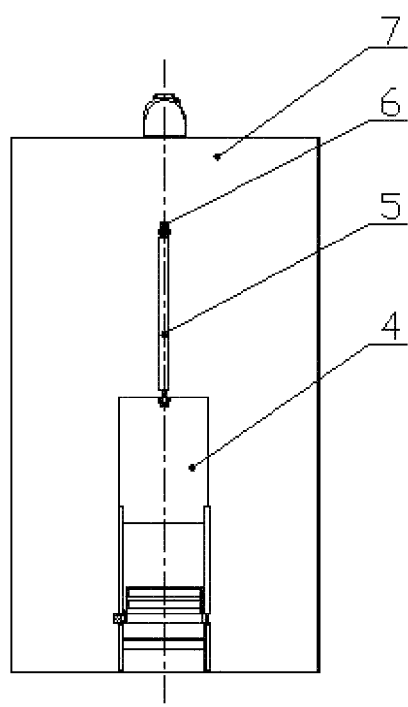
FIG. 29 is a left view of FIG. 27.
Figure 30:
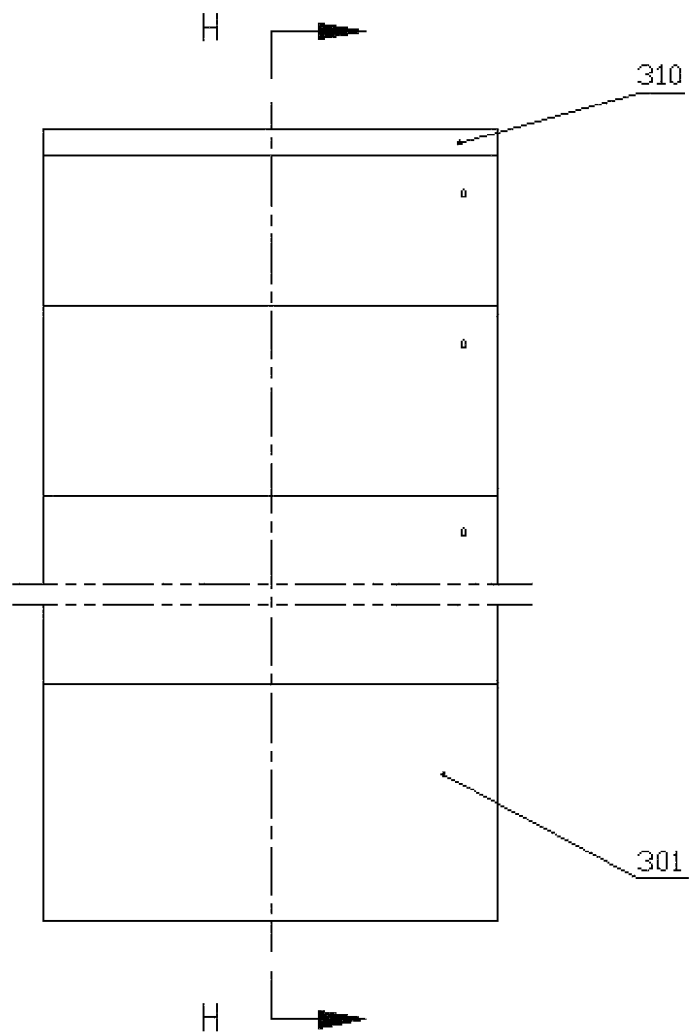
FIG. 30 is a structural schematic diagram of a container unit under the application of a single container of the present invention.
Figure 31:
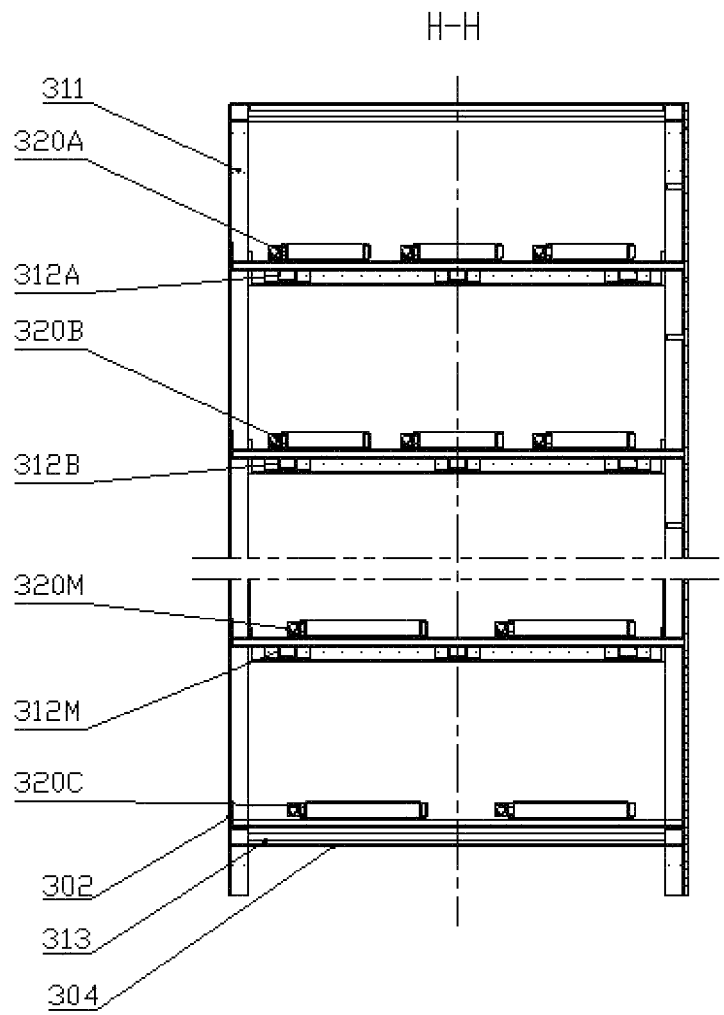
FIG. 31 is an H-H view of FIG. 30.
Figure 32:
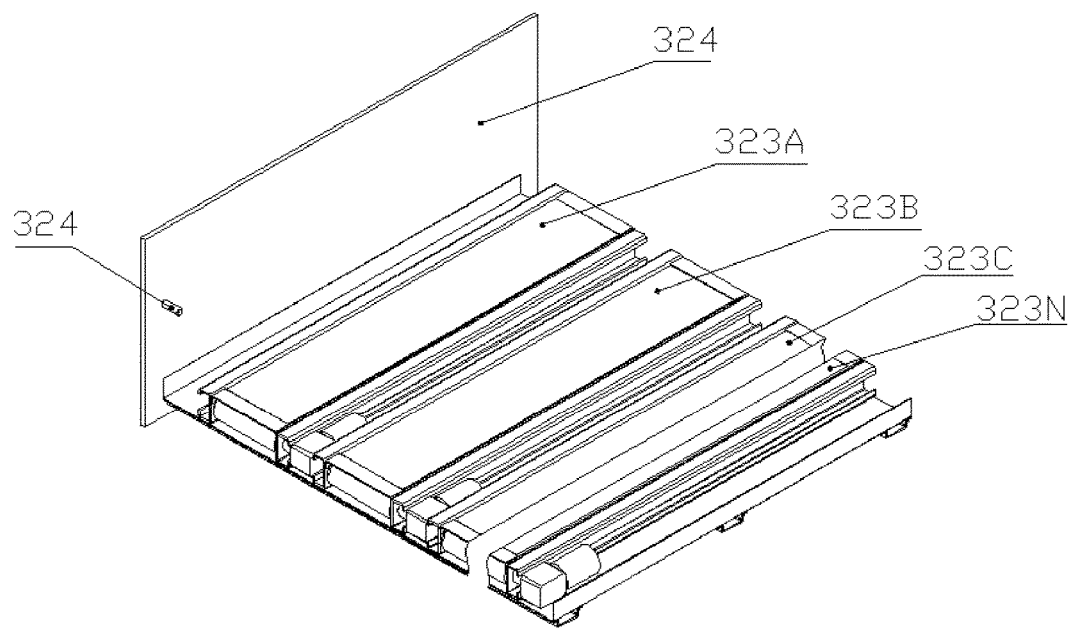
FIG. 32 is a structural schematic diagram of a drawer-type goods shelf under the application of a single container of the present invention.

A crawler-type automatic vending machine involved by the present invention, as shown in FIG. 11, FIG. 12 and FIG. 13, comprises a replenishment unit 1, a transfer unit 2, a container unit 3, a detection and control unit 8, a cloud management platform 10, a payment system 11, a front sealing plate 7 and a rear sealing plate 9.

The replenishment unit 1, the transfer unit 2 and the container unit 3 are connected along a goods transportation direction successively; and relative positions and connection relation among them are consistent with those of replenishment unit 1, the transfer unit 2A and the container unit 3A in Embodiment 1. The front sealing plate 7 is installed outside a feed side of the transfer unit 2, and is flush with an end surface of the transfer unit 2; a stocking door 4 is arranged outside the front sealing plate 7, and the structural form and connection mode are consistent with those in Embodiment 1. The rear sealing plate 8 is installed outside a discharge end of the container unit 3; and a plurality of sensors are arranged by the detection and control unit 8 in the above units to monitor the state of the whole vending machine, and motion of an actuator of each unit is controlled by the detection and control unit 8.

The specific structure of the replenishment unit 1 involved by the present invention is the same as that in specific Embodiment 1. The specific structure of the transfer unit 2 is the same as that of the transfer unit 2Y at the end in specific Embodiment 1; and the detection and control system 8, the could management platform 10 and the payment system 11 are consistent with those in specific Embodiment 1, and will not be repeated herein.

The container unit involved by the present invention is shown in FIG. 12 and FIG. 13. The overall structure is the same as that of the container unit 3X at the end in specific Embodiment 1, and a tray and a tray guide rail are not arranged on the crawler-type aisle 323.

A workflow of the automatic vending machine involved by the present invention is divided into two parts, i.e. replenishment and selling, specifically as follows.

1. The replenishment method is as follows:

The replenishment of the vending machine could be divided into empty tray output and goods adding, specifically as follows:

1) A replenisher scans an ID of the automatic vending machine with a terminal, such as a mobile phone; the terminal is connected with the cloud management platform 10 through a wireless network, such as GPRS, 3G, 4G, 5G and WIFI; and the cloud management platform 10 retrieves the ID of the automatic vending machine to match with the tray and commodity data in the current vending machine, and then outputs a replenishment list of the vending machine to the terminal;

2) The replenisher selects any replenished commodity according to the replenishment list and scans a barcode of the replenished commodity with the terminal, such as a mobile phone; the terminal acquires a name, a production date, a manufacturer and other information of the commodity by scanning, and uploads the information to the cloud management platform 10; and the cloud management platform 10 synchronizes the data to the payment system 11 of the vending machine;

3) The payment system 11 checks whether the commodity placed currently meets the requirement; Step 4) is performed if yes; and if no, the vending machine makes an alarm prompt (wrong specification, sold out, expired, and wrong commodity, etc.) according to an error reason, prompting to rescan the correct commodity;

4) The payment system 10 issues a mode conversion instruction to the detection and control unit 8 to convert a selling mode into a replenishment mode;

5) The detection and control unit 8 inquires the crawler-type aisle 323A, 323B, 323C or . . . 323N corresponding to the replenished commodities;

6) The replenisher places the commodities onto the replenishment crawler 120 one by one according to a certain interval;

7) The replenisher starts a replenishment procedure, and the transfer belt conveyor 213 on the transfer platform 210 is aligned with the replenishment crawler 120, 8) The transfer belt conveyor 213 and the replenishment crawler 120 are started to deliver the commodities 325 onto the transfer belt conveyor 213;

9) The transfer platform 210 is aligned with the corresponding crawler-type aisle;

10) The transfer belt conveyor 213 and the crawler-type aisle are started to deliver the commodities 325 onto the corresponding crawler-type aisle, and one commodity is sent in the crawler-type aisle when the crawler-type aisle goes forward by one step pitch;

11) After all commodities on the transfer belt conveyor 213 are delivered into the crawler-type aisle, the transfer belt conveyor is stopped;

12) If the commodities on the crawler-type aisle are not replenished fully, Steps 8)~11) are repeated until the crawler-type aisle are replenished fully with the commodities;

13) If such kind of commodities corresponds a plurality of replenishment crawlers, Steps 8)~12) are repeated, and so on until the goods are fully replenished;

14) The replenisher scans another commodity, Steps 2)~13) are repeated, so repeatedly until the goods are fully replenished;

15) After the replenishment is completed, the payment system of the vending machine updates the latest state information of the current automatic vending machine, including a name, a code, a size, a weight, a production date, a price, a quantity, the aisle and other information of the sold commodities, and synchronizes all the information to the cloud management platform;

16) The payment system issues the mode conversion instruction to the detection and control system to convert the replenishment mode into the selling mode;

2. Selling:

1) Sellable commodities in a current vending machine module are displayed on a display screen of the vending machine;

2) The customer selects the name and quantity of the commodities in the display screen of the vending machine, and clicks OK;

3) The system judges whether the commodities selected by the user are sellable, and when the commodities are not sellable (for example, the quantity is insufficient, discount conditions are not met, and instant faults of equipment are presented), a prompt is given, and the user modifies the choice or returns to a home page; and if the commodities are sellable, a payment amount is displayed and a commodity payment code is generated;

4) The user scans the commodity payment code with the mobile terminal or pays in cash;

5) The prompt is given if the payment fails, and the user selects to pay again or returns to the home page;

6) If the payment is succeeded, a control system determines a placing position of the commodities according to goods information inputted by the customer, including the name and the quantity;

7) The detection and control system 8 controls the transfer platform 210 of the transfer unit 2 to arrive at the front end of the crawler-type aisle 323 that the goods are placed and be aligned with the crawler-type aisle 323;

8) The crawler-type aisle 323 and the transfer belt conveyor 213 are started; the trays 325 loaded with the commodities are delivered onto the transfer belt conveyor 213 one by one; and one commodity is pushed to the transfer belt conveyor 213 when the motor of the crawler-type aisle goes forward by a step pitch each time;

9) When the commodities detected by the system fully arrive on the transfer belt conveyor 213, the transfer belt conveyor 213 and the crawler-type aisle 323 are stopped;

10) The transfer platform 210 is started to deliver the commodities to positions near a goods taking window;

11) The goods taking door 220 is opened, and the transfer platform 210 delivers the commodities to the goods taking door 220 and prompts the customer that the goods can be taken;

12) After the customer takes away the goods from the trays, the goods taking door 220 is closed, the transfer platform 210 goes back;

13) The commodities purchased by the customer are not fully taken away, Steps 7)~12) are repeated until all commodities are transported completely;

14) After selling is completed, the payment system updates the latest state information of the automatic vending machine, and synchronizes all the information to the cloud management platform.

We claim:

1. A crawler-type automatic vending machine, comprising a replenishment unit, m transfer units, n container units, a detection and control unit, a cloud management platform and a payment system, wherein the replenishment unit, the transfer units and the container units are connected successively to form an integral crawler-type automatic vending machine, and wherein m and n are natural numbers other than 0; when n is equal to 1, m is equal 1; when n is greater than 1, m is equal to n+1; and when n is greater than 1 and m is equal to n+1, the m transfer units and the n container units are connected alternately, and the last unit is the transfer unit.

2. The crawler-type automatic vending machine according to claim 1, wherein when n is equal 1 and m is equal 1, the transfer units and the container units are made into an integrated structure.

3. The crawler-type automatic vending machine according to claim 1, wherein the replenishment unit is a fixed replenishment unit or a mobile replenishment unit, and is located at a feed end of the crawler-type automatic vending machine and abuts against the first transfer unit; the replenishment unit comprises a support frame, a replenishment crawler and a tray guide rail; the support frame is located at a bottom of the replenishment unit; the replenishment crawler is located at an upper part of the support frame and could rotates forwardly and reversely; and the tray guide rail is arranged at one side of the replenishment crawler and fixed to the support frame.

4. The crawler-type automatic vending machine according to claim 1, wherein each of the transfer units comprises a transfer container and a transfer platform; the transfer platform is located inside the transfer container and is a platform having three vertical sliding pairs and capable of moving along three coordinate directions (X, Y and Z) under respective drive of three independent motors; a transfer belt conveyor capable of conducing forward and reverse transmission is arranged on the transfer platform; a tray guide rail for limiting and guiding trays is arranged at one side of an upper part of the transfer belt convey or close to a rear sealing plate; and the three independent motors and the transfer belt conveyor of the transfer platform are connected and controlled by the detection and control unit.

5. The crawler-type automatic vending machine according to claim 1, wherein the transfer container is composed of a framework and a sealing plate; the sealing plate comprises a front sealing plate, a rear sealing plate and a top sealing plate; a set of payment system composed of a touch screen and a cash register is arranged on the front sealing plate; a goods taking door is arranged below the touch screen; however, when a plurality of transfer units are arranged, the touch screen, the cash register and the goods taking door are not arranged on the front sealing plate of a first transfer cabinet; and a lifting guide rail is arranged on a column of the framework, and the transfer platform is in contact fit with the lifting guide rail and moves up and down along the lifting guide rail.

6. The crawler-type automatic vending machine according to claim 5, wherein a height of the goods taking door shall be the most convenient for a customer to take; a lower edge of the goods taking door of a conventional commodity is set to be 0.8 m±0.5 m, while a height of a lower edge of the goods taking door of a heavy or large commodity is flush with a height of a conveying belt at an upper part of a belt conveyor in the container unit; the goods taking door comprises a lifting door plate, a lifting motor and a fixed hinge base; and the lifting door plate is placed in a clamping groove of a goods taking door hole of the front sealing, plate and is an electric lifting door plate, thereby achieving automatic opening and closing of the goods taking door under the control of the detection and control unit.

7. The crawler-type automatic vending machine according to claim 1, wherein the container unit is composed of a container body, a multilayer drawer-type goods shelf and a belt conveyor arranged at a bottom of the container unit, but when a plurality of container units are arranged, the drawer-type goods shelf, rather than the belt conveyor, is arranged at the bottom of the container unit at an end.

8. The crawler-type automatic vending machine according to claim 7, wherein the container body comprises a supporting framework, a container sealing plate and an aisle door; the supporting framework comprises a column and a beam; the container sealing plate comprises the front sealing plate which is equipped with or not equipped with an insulating layer, the rear sealing plate, an upper sealing plate and a lower sealing plate; an air duct interface connected to an air duct at an end of an air conditioner is arranged on the rear sealing plate; the aisle door is arranged between two layers of beams at front and rear ends of the container body; a relatively closed space is formed inside the container body by the aisle door together with the front sealing plate, the rear sealing plate, the upper sealing plate and the lower sealing plate, and the aisle door is provided with an independent electric opening and closing mechanism automatically controlled by the detection and control unit; and the aisle door and the independent electric opening and closing mechanism of the aisle door are not arranged for the container body which has no insulation function.

9. The crawler-type automatic vending machine according to claim 7, wherein the drawer-type goods shelf is installed in the container body and comprises a goods shelf drawer, a crawler-type aisle, a drawer lock and a tray guide rail; the goods shelf drawer is placed on the beam of the goods shelf; a goods shelf drawer panel is made of transparent material; a drawer lock is arranged on the goods shelf drawer panel; the crawler-type aisle is fixedly installed on the goods shelf drawer; each crawler-type aisle is arranged in parallel and independently equipped with an aisle drive motor; the aisle drive motor is connected to the crawler-type aisle and drives the crawler-type aisle to do forward or reverse motion; and the tray guide rail is arranged at one side of each crawler-type aisle, the trays are reversely arranged on the crawler-type aisle along a motion direction in order, and commodities are placed in the trays.

10. The crawler-type automatic vending machine according to claim 7, wherein each tray comprises a plurality of guide wheels and a tray box; the guide wheels are uniformly distributed at a lower position of one side of the tray box; the tray box is a bearing unit of the goods; the guide wheels are matched with the tray guide rail and move freely along the direction of the tray guide rail; and the tray guide rail limits and guides the guide wheels and is parallel to a motion direction of the trays.

11. The crawler-type automatic vending machine according to claim 7, wherein the belt conveyor is located in a middle position of a bottom in the container body, a support of the belt conveyor is fixedly installed on the beam at the bottom layer of the supporting framework, and the tray guide rail is arranged on the belt conveyor; the length of the belt conveyor is equal to or slightly less than that of the container, and the width of the belt conveyor is greater than or equal to that of the commodity sold at the container; the tray guide rail is arranged at a side of the belt conveyor close to the rear sealing plate along the X axis, and the length of the tray guide rail is consistent with that of the belt conveyor to limit and guide the tray; the conveying belt of the belt conveyor operates forwards to deliver the goods trays to the previous transfer unit, or operates reversely to deliver the goods trays to the next transfer unit for replenishment.

12. The crawler-type automatic vending machine according to claim 1, wherein the container unit and the transfer unit are made into an integrated structure, and a discharge end of the container unit is provided with a transfer unit.

13. The crawler-type automatic vending machine according to claim 1, wherein a feed end sealing plate and a discharge end sealing plate are respectively arranged at a feed end and a discharge end of the crawler-type automatic vending machine; the feed end sealing plate is fixedly installed outside a feed end cabinet of the first transfer unit; a stocking door is formed on the feed end sealing plate; a door hole is aligned with the replenishment crawler; the stocking door is opened and closed under the control of a detection and control system and does synergic motion with the replenishment crawler; and the discharge end sealing plate is installed outside an end of the automatic vending machine, and forms a closed whole with the feed end sealing plate, the transfer unit and the container unit.

14. The crawler-type automatic vending machine according to claim 1, wherein the detection and control unit comprises a microcontroller and a wireless communication unit; and the microcontroller achieves two-way communication with the cloud management platform and the payment system through the wireless communication unit, uploads state information of the automatic vending machine, receives commands of the payment system and the cloud management platform, and controls operation of all units of the automatic vending machine;

the cloud management platform receives information uploaded by the detection and control unit and the payment system of each automatic vending machine, automatically inputs the information into a corresponding database respectively, monitors a selling condition of each automatic vending machine in real time, and monitors a stock condition on the aisle of each automatic vending machine and a guarantee period of the commodity; when the detection and control unit detects that the goods on an aisle are close to a lower limit of the stock or exceed the guarantee period, alarm information is issued, and operating personnel replenishes the goods in a targeted way according to the prompt of the platform, and take out defective commodities to replace the defective commodities with new goods; and the payment system is composed of the touch screen and the cash register with an embedded system; the touch screen and the cash register with the embedded system are connected to the payment platform and the cloud management platform; the touch screen is installed on each transfer unit for displaying the commodities of the corresponding container unit, so that customers click on each touch screen to select the commodities matched with the container; a camera on the touch screen is configured to scan faces of the customers to complete the payment, or a two-dimensional code is generated by the touch screen on a screen for selecting the commodities for scanning the code for payment by the customer with a mobile phone, or the customer selects to carry out the cash payment through the cash register; after the payment is completed, the payment system sends paid information of a commodity to the detection and control unit and the cloud management platform; the detection and control unit controls the transfer platform in the transfer unit to move to a crawler aisle in which the commodity is located and to be aligned with the crawler aisle, controls a crawler aisle motor to step forward to push up the goods trays to the transfer platform, and then controls the transfer platform to move to the goods taking door; and the detection and control system makes an indication signal to indicate the customers to take goods, thereby completing purchase operation.

15. An automatic vending method using the crawler-type automatic vending machine of claim 1, comprising:
(I) replenishment:
the replenishment of the vending machine is divided into empty tray output and goods adding, with specific operation as follows:
1) a replenisher scans an ID of the automatic vending machine with a mobile terminal; the mobile terminal is connected with the cloud management platform through a wireless network; and the cloud management platform retrieves the ID of the automatic vending machine to match with the tray and commodity data in the current vending machine, and then outputs a replenishment list of the vending machine to the mobile terminal;
2) the replenisher selects any replenished commodity according to the replenishment list and scans a barcode of the replenished commodity with the mobile terminal; the mobile terminal acquires a name, a production date, a manufacturer and other information of the commodity by scanning and uploads the information to a cloud server; and the cloud server synchronizes the data to the payment system of the vending machine;
3) the payment system checks whether the commodity placed currently is correct; Step 4) is performed if yes, and if no, the vending machine makes an alarm prompt according to an error reason, prompting to rescan the correct commodity;
4) the payment system issues a mode conversion instruction to the detection and control system to convert a selling mode into a replenishment mode;
5) the detection and control system inquires the container and the aisle in which the replenished commodities are located, starts the transfer unit at a rear end of the container, and starts the transfer platform to move to the corresponding aisle along the X, Y and Z axes; the transfer belt conveyor on the transfer platform is aligned with the aisle; meanwhile, the transfer belt conveyor and an aisle crawler are reversely started; the aisle crawler is reversely operated to deliver the empty trays on the aisle crawler into the transfer belt conveyor; a tray is dropped out when an aisle crawler motor goes back by a step pitch; after the system detects that the trays are fully placed on the transfer belt conveyor or the empty trays on the aisle crawler are fully delivered out, the transfer belt conveyor and the aisle crawler are stopped, and the transfer platform is moved downwards, so that the transfer belt conveyor is aligned with a transmission belt at a bottom of the rear container unit; meantime, all transfer platforms of the rear transfer unit are moved downwards, so that the transfer belt conveyor is aligned with the transmission belt at a lower part of the front container unit; then, the transfer belt conveyor and the transmission belt are reversely started to deliver the trays to the transmission belt of the rear container unit; the transmission belt of the rear container unit delivers the trays to the next transfer platform, and then, delivers the trays to the transmission belt at a lower part of a next container unit by moving the transfer platform back and forth, and so on, until the trays are delivered to the replenishment crawler of the replenishment unit; and if the empty trays on the aisle crawler are not fully dropped out, the above steps are repeated, until the empty trays on the aisle are fully transported to the replenishment crawler;
6) goods adding: after the vending machine transports all the empty trays on the aisle corresponding to the commodities inside the container to the replenishment crawler, the replenisher puts the commodities in the empty trays one by one; one commodity is placed on each tray until the trays on the replenishment crawler are full; then, the replenisher starts a replenishment procedure; the transfer belt conveyor on the transfer platform is aligned with the replenishment crawler; after the commodity is delivered to the transfer platform, the belt conveyor below the container is started; the transfer platform delivers the trays onto the belt conveyor; the conveying belt delivers the trays onto the next front transfer platform, and so on, until the trays are delivered to the transfer platform at a front end of the container on which the trays are placed; then, the transfer platform at the front end of the container on which the trays are placed moves to be aligned with the placed aisle closely; the transfer platform and the aisle crawler are started to deliver the trays into the aisle; a tray is delivered into the aisle when the aisle crawler motor goes ahead by a step pitch; and if the aisle is not full of the trays, the above process is repeated, until the aisle is full;
7) if the commodities correspond to a plurality of replenishment crawlers, the system continues to start a replenishment procedure of another belt; the empty trays on another aisle crawler are transported to the replenishment crawler successively; the replenisher puts the commodities into the empty trays successively, and then starts a stock procedure; the above stock process is repeated, and so on, until the commodities are fully replenished; then the replenisher scans another commodity; and the above processes are repeated in this way until all the commodities of the vending machine are fully replenished;
8) after the replenishment is completed, the payment system of the vending machine updates the latest state information (including the name, the code, the size, the weight, the production date, the price, the quantity, the aisle and other information of the sold commodities) of the current automatic vending machine, and synchronizes all information to the cloud management platform;
9) the payment system issues the mode conversion instruction to the detection and control system to convert the replenishment mode into the selling mode;

(II) Selling:
1) sellable commodities in a current vending machine module are displayed on a display screen of the transfer unit;
2) the customer selects the name and quantity of the commodities in the display screen, and clicks OK;
3) the system judges whether the commodities selected by the user are sellable, and when the commodities are not sellable (the quantity is insufficient, discount conditions are not met, and instant faults of equipment are presented), a prompt is given, and the user modifies the choice or return to a home page; and if the commodities are sellable, a payment amount is displayed and a commodity payment code is generated;
4) payment is conducted by scanning a face through a camera or scanning the commodity payment code with the mobile terminal by the user or in cash;
5) the prompt is given if the payment fails, and the user selects to pay again or returns to the home page;
6) if the payment is succeeded, a monitoring and control unit determines placing positions of the goods according to goods information inputted by the customer, including the name and the quantity, and then, controls the transfer platform to move along the X, Y and Z axes to arrive at a front end of the aisle for placing the goods and align with the aisle, and starts an aisle crawler machine and a transfer belt conveyor; the trays loaded with the goods are delivered onto the transfer platform from the aisle one by one, and a step pitch is made by the aisle crawler each time; when the trays detected by the system fully arrive on the transfer platform, the belt stops transferring; the transfer platform is started to move along the X, Y and Z axes to deliver the trays to places near a goods taking window; the detection and control unit controls to open the goods taking door; the transfer platform delivers the trays to the goods taking door and prompts the customer to take the goods; after the customer takes away the goods from the trays, the goods taking door is closed, and the transfer platform goes back and moves down and is aligned with the conveying belt at the bottom of the container; the transfer belt conveyor and the conveying belt are reversely started; the empty trays are delivered to the conveying belt; after the empty trays are fully away from the transfer belt conveyor, the transfer belt conveyor is stopped; meanwhile, the transfer platform at the rear end of the container is synchronously started to move along the X, Y and Z axes to align with the conveying belt at the bottom of the container; the conveying belt and the transfer belt conveyor at the rear end are started; the empty trays are delivered onto the transfer belt conveyor at the rear end; when the empty trays fully enter into the transfer platform, the conveying belt and the transfer belt conveyor at the rear end are stopped; the transfer platform at the rear end is started to move along the X, Y and Z axes and to be aligned with the aisle corresponding to the trays closely; then, the transfer belt conveyor is started, the empty trays are pushed to the aisle crawler, the aisle crawler is started to access the empty trays to the aisle, one empty tray is accessed to the aisle when the aisle crawler motor goes forward a step pitch, and when the trays are fully away from the transfer platform to enter into the aisle, the belt and the aisle crawler are stopped, and finally, the transfer platform at the rear end of the container returns to an original position;
7) if the commodities purchased by the customer are not shipped completely, the above shipment process is repeated until all commodities purchased by the customers are shipped completely, and the selling is completed;
8) after the selling is completed, the payment system updates the latest state information of the automatic vending machine, and synchronizes all the information to the cloud management platform;

(III) fault handling and maintenance:
when the vending machine fails or needs to be maintained, the system would give an alarm signal, and a device administrator confirms the fault according to the alarm signal, and then correspondingly handles the fault in a targeted way;

1) aisle fault: when an aisle in the container has a blocking phenomenon, the system would give the alarm signal; the administrator confirms the faulty aisle according to the alarm signal, opens the drawer lock of the drawer-type goods shelf on which the aisle is located, draws out the whole drawer-type goods shelf, and maintains or replaces the aisle, and after maintenance or replacement, the administrator reinserts the drawer type goods shelf into the container, and then restarts the container system;

2) expired goods: when the system detects that some goods in the container will be expired, the system would give the prompt signal; if there is only one container, based on the prompt signal, the administrator extracts the goods to be expired according to a goods fault handling process and adds new goods; and if the quantity of the containers is greater than 1, the administrator takes out all goods to be expired through a special taking procedure, and this process is consistent with the customer purchase process.

* * * * *